(12) United States Patent
Cavendish et al.

(10) Patent No.: US 10,330,784 B2
(45) Date of Patent: Jun. 25, 2019

(54) SECURE RANGE DETERMINATION PROTOCOL

(71) Applicant: QUALCOMM Incorporated, San Diego, CA (US)

(72) Inventors: Dirceu Cavendish, San Diego, CA (US); Ashok Bhatia, San Diego, CA (US); Nicolas Graube, Cambridge (GB); Vishal Agarwal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 15/481,738

(22) Filed: Apr. 7, 2017

(65) Prior Publication Data

US 2018/0292522 A1    Oct. 11, 2018

(51) Int. Cl.
    *G01S 13/76*    (2006.01)
    *H04W 64/00*    (2009.01)
    (Continued)

(52) U.S. Cl.
    CPC .............. *G01S 13/765* (2013.01); *G01S 5/14* (2013.01); *G01S 13/06* (2013.01); *G01S 13/426* (2013.01);
    (Continued)

(58) Field of Classification Search
    CPC .......... G01S 13/765; G01S 5/14; G01S 13/06; G01S 13/426; G01S 13/534;
    (Continued)

(56) References Cited

U.S. PATENT DOCUMENTS

2004/0236937 A1* 11/2004 Perkins ............... H04L 63/0414
                                                    713/150
2014/0335885 A1   11/2014 Steiner et al.
(Continued)

OTHER PUBLICATIONS

Aldana C., et al., "Stanton Addition of p802.11-MC Fine Timing Measurement (FTM) to p802.1AS-Rev: Authors," Mar. 9, 2015, XP055301130, 24 pages, URL: http://www.ieee802.org/1/files/public/docs2015/as-kbstanton-caldana-ftm-addition-to-las-guiding-prin . . . [retrieved on May 11, 2018].
(Continued)

*Primary Examiner* — Barry W Taylor
(74) *Attorney, Agent, or Firm* — Hunter Clark PLLC

(57) ABSTRACT

Disclosed are methods, devices, systems, apparatus, servers, media, and other implementations, including a method, performed at a first wireless device, for secure range determination that includes transmitting a first signed message at a first time instance, with the first signed message, including a first payload, configured to be received by a second wireless device at a second time instance, and receiving at a fourth time instance a verifiable acknowledgement message transmitted from the second wireless device at a third time instance in response to the first signed message. The method further includes verifying that the verifiable acknowledgement message originated from the second wireless device, and, responsive to a verification that the verifiable acknowledgement message originated from the second wireless device, transmitting a second signed message including a second payload with at least timing information for the first time instance and the fourth time instance.

52 Claims, 7 Drawing Sheets

(51) Int. Cl.
*H04L 5/00* (2006.01)
*G01S 13/06* (2006.01)
*G01S 13/534* (2006.01)
*H04W 84/12* (2009.01)
*G01S 13/42* (2006.01)
*H04B 5/00* (2006.01)
*H04L 12/26* (2006.01)
*G01S 5/14* (2006.01)
*H04L 9/32* (2006.01)
*H04L 29/06* (2006.01)
*H04W 12/06* (2009.01)

(52) U.S. Cl.
CPC .......... *G01S 13/534* (2013.01); *H04B 5/0043* (2013.01); *H04L 5/0055* (2013.01); *H04L 9/3247* (2013.01); *H04L 9/3297* (2013.01); *H04L 43/10* (2013.01); *H04L 63/12* (2013.01); *H04W 12/06* (2013.01); *H04W 64/003* (2013.01); *H04W 64/006* (2013.01); *H04W 84/12* (2013.01); *H04L 2209/80* (2013.01)

(58) Field of Classification Search
CPC ..... H04B 5/0043; H04L 5/0055; H04L 43/10; H04L 43/0864; H04L 63/0435; H04L 63/0442; H04L 63/061; H04L 9/0825; H04W 64/006; H04W 84/12; H04W 12/04
See application file for complete search history.

(56) References Cited

U.S. PATENT DOCUMENTS

| | | |
|---|---|---|
| 2015/0222602 A1 | 8/2015 | Steiner et al. |
| 2015/0319631 A1 | 11/2015 | Aldana et al. |
| 2016/0044524 A1 | 2/2016 | Ben-Haim et al. |
| 2016/0080960 A1 | 3/2016 | Aldana et al. |
| 2017/0064575 A1* | 3/2017 | Eyal ........................ H04L 67/18 |
| 2017/0346852 A1* | 11/2017 | Chhabra ............. H04L 63/0435 |
| 2018/0103362 A1* | 4/2018 | Segev .................. H04W 8/005 |

OTHER PUBLICATIONS

International Search Report and Written Opinion—PCT/US2018/020374—ISA/EP—dated May 24, 2018.
Francillon, A., Danev, B., & Capkun, S. (Feb. 2011,). Relay Attacks on Passive Keyless Entry and Start Systems in Modern Cars. Proceedings of the Network and Distributed System Security Symposium (NDSS), 15 pgs.
Wang, Q., Khurana, H., Huang, Y., & Nahrstedt, K. (2009). Time Valid One-Time Signature for Time-Critical Multicast Data Authentication. IEEE, University of Illinois at Urbana-Champaign, 9 pgs.

* cited by examiner

SECURE RANGE DETERMINATION PROTOCOL

BACKGROUND

Various communication technologies can support implementations of range/RTT estimation based on conventional ranging protocols, such as Institute of Electrical and Electronics Engineers (IEEE) 802.11mc (WiFi). However, these protocols are not secure, making them vulnerable to RTT inflation and deflation attacks.

SUMMARY

In some variations, an example method for secure range determination is provided. The method includes transmitting, by a first wireless device, a first signed message at a first time instance, with the first signed message including a first payload and configured to be received by a second wireless device at a second time instance, and receiving at a fourth time instance, by the first wireless device, a verifiable acknowledgement message, transmitted from the second wireless device at a third time instance in response to the first signed message, with the verifiable acknowledgement message allowing the first wireless device to verify that the verifiable acknowledgement message originated from the second wireless device. The method further includes verifying, at the first wireless device, that the verifiable acknowledgement message originated from the second wireless device, and, responsive to a verification that the verifiable acknowledgement message originated from the second wireless device, transmitting, by the first wireless device, a second signed message including a second payload with at least timing information for the first time instance and the fourth time instance at which the first wireless device received the verifiable acknowledgement message.

Embodiments of the method may include at least some of the features described in the present disclosure, including one or more of the following features.

Each of the first payload and the second payload may include one or more of, for example, a first identifier associated with the first wireless device, a second identifier associated with the second wireless device, and/or a respective nonce value.

The verifiable acknowledgement message may include a signed acknowledgement message with an acknowledgement payload including one or more of, for example, a first identifier associated with the first wireless device, a second identifier associated with the second wireless device, acknowledgement timing information associated with at least one of the verifiable acknowledgement message or the first signed message, and/or a nonce value.

Receiving the verifiable acknowledgement message may include further receiving, by the first wireless device, subsequent to receiving the verifiable acknowledgement message at the fourth time instance, a further signed message with a further payload from the second wireless device within a threshold time period following the receiving the verifiable acknowledgement message at the fourth time instance, by the first wireless device, with the further signed message being configured to indicate that the verifiable acknowledgement message was transmitted by the second wireless device.

A range between the first wireless device and the second wireless device may be determined based, at least in part, on the timing information for the first time instance and the fourth time instance included in the second payload.

The first signed message, the second signed message, and the verifiable acknowledgement message may be generated according to a fine timing measurement (FTM)-based round-trip time (RTT) protocol.

The first signed message, the second signed message, and the verifiable acknowledgement message may be generated according to a round-trip time (RTT) protocol performed using a radio technology comprising one or more of Bluetooth, near-field communication (NFC), or WiFi.

The first signed message and the second signed message may each be signed using at least one cryptographic key associated with the first wireless device and the second wireless device, the at least one cryptographic key including one of, for example, a symmetrical cryptographic key, and/or a private cryptographic key of a private-public asymmetric key pair.

In some variations, a wireless device is provided that includes a transceiver configured to transmit, by the wireless device, a first signed message at a first time instance, with the first signed message including a first payload and configured to be received by another wireless device at a second time instance, and receive at a fourth time instance a verifiable acknowledgement message, transmitted from the other wireless device at a third time instance in response to the first signed message, with the verifiable acknowledgement message allowing the wireless device to verify that the verifiable acknowledgement message originated from the other wireless device. The wireless device further includes one or more processors, coupled to the transceiver, configured to verify that the verifiable acknowledgement message originated from the other wireless device. The transceiver is further configured to, in response to a verification that the verifiable acknowledgement message originated from the other wireless device, transmit a second signed message including a second payload with at least timing information for the first time instance and the fourth time instance at which the wireless device received the verifiable acknowledgement message.

In some variations, an apparatus for secure range determination is provided. The apparatus includes means for transmitting, by a first wireless device, a first signed message at a first time instance, with the first signed message including a first payload and configured to be received by a second wireless device at a second time instance, and means for receiving at a fourth time instance, by the first wireless device, a verifiable acknowledgement message, transmitted from the second wireless device at a third time instance in response to the first signed message, with the verifiable acknowledgement message allowing the first wireless device to verify that the verifiable acknowledgement message originated from the second wireless device. The apparatus further includes means for verifying, at the first wireless device, that the verifiable acknowledgement message originated from the second wireless device, and means for transmitting, by the first wireless device, in response to a verification that the verifiable acknowledgement message originated from the second wireless device, a second signed message including a second payload with at least timing information for the first time instance and the fourth time instance at which the first wireless device received the verifiable acknowledgement message.

In some variations, a non-transitory computer readable media is provided, that is programmed with instructions, executable on a processor, to transmit, by a first wireless device, a first signed message at a first time instance, with the first signed message including a first payload and configured to be received by a second wireless device at a second time instance, and receive at a fourth time instance, by the first wireless device, a verifiable acknowledgement message, transmitted from the second wireless device at a third time instance in response to the first signed message, with the verifiable acknowledgement message allowing the first wireless device to verify that the verifiable acknowledgement message originated from the second wireless device. The computer readable media includes further instructions to verify, at the first wireless device, that the verifiable acknowledgement message originated from the second wireless device, and, responsive to a verification that the verifiable acknowledgement message originated from the second wireless device, transmit, by the first wireless device, a second signed message including a second payload with at least timing information for the first time instance and the fourth time instance at which the first wireless device received the verifiable acknowledgement message.

Embodiments of the wireless device, the apparatus, and the computer-readable media may include at least some of the features described in the present disclosure, including at least some of the features described above in relation to the method.

In some variations, an additional method for secure range determination is provided. The additional method includes receiving, by a wireless device, a first signed message comprising a first payload transmitted from another wireless device at a first time instance, and received by the wireless device at a second time instance, and transmitting at a third time instance, by the wireless device, a verifiable acknowledgement message responsive to the first signed message, with the verifiable acknowledgement message allowing the other wireless device to verify that the verifiable acknowledgement message originated from the wireless device. The additional message further includes receiving, by the wireless device, a second signed message transmitted from the other wireless device comprising a second payload with at least timing information for the first time instance and a fourth time instance at which the other wireless device received the verifiable acknowledgment message, with the second signed message being transmittable from the other wireless device following a verification of the verifiable acknowledgement message at the other wireless device.

Embodiments of the additional method may include at least some of the features described in the present disclosure, including one or more of the following features.

Each of the first payload and the second payload comprises one or more of, for example, an identifier associated with the wireless device, another identifier associated with the other wireless device, and/or a respective nonce value.

The respective nonce value may be computed at the other wireless device based on one or more of, for example, a sequence value used for exchanging messages between the wireless device and the other wireless device, and/or a random value.

Transmitting the verifiable acknowledgement message may include producing, at the wireless device, a signed acknowledgement message including an acknowledgement payload, and transmitting the signed acknowledgement message.

The acknowledgement payload may include one or more of, for example, an identifier associated with the wireless device, another identifier associated with the other wireless device, acknowledgement timing information associated with the verifiable acknowledgement message or the first signed message, and/or a nonce value.

Transmitting the verifiable acknowledgement message may include one of, for example, transmitting, by the wireless device, the verifiable acknowledgement message after a random delay period following receipt of the first signed message from the other wireless device, or further transmitting, subsequent to the transmitting the verifiable acknowledgement message, by the wireless device, a further signed message with a further payload from the wireless device within a threshold time period following the transmitting the verifiable acknowledgement message, with the further signed message configured to indicate that the verifiable acknowledgement message was transmitted by the wireless device.

The additional method may further include, in response to receiving the second signed message, determining the first time instance and the fourth time instance from the timing information included in the second payload of the second signed message, and determining a range between the wireless device and the other wireless device based, at least in part, on the determined first time instance and the fourth time instance.

The first signed message, the second signed message, and the verifiable acknowledgement message may be generated according to a fine timing measurement (FTM)-based round-trip time (RTT) protocol.

The first signed message, the second signed message, and the verifiable acknowledgement message may be generated according to a round-trip time (RTT) protocol performed using a radio technology comprising one or more of Bluetooth, near-field communication (NFC), and/or WiFi.

The first signed message and the second signed message may each be signed using at least one cryptographic key associated with the wireless device and the other wireless device, the at least one cryptographic key including one of, for example, a symmetrical cryptographic key, and/or a private cryptographic key of a private-public key pair.

In some variations, an additional wireless device is provided that includes one or more processors, and a transceiver coupled to the one or more processors, the transceiver configured to receive a first signed message comprising a first payload transmitted from another wireless device at a first time instance, and received by the wireless device at a second time instance, and transmit at a third time instance, by the wireless device, a verifiable acknowledgement message responsive to the first signed message, with the verifiable acknowledgement message allowing the other wireless device to verify that the verifiable acknowledgement message originated from the wireless device. The transceiver is further configured to receive, by the wireless device, a second signed message transmitted from the other wireless device including a second payload with at least timing information for the first time instance and a fourth time instance at which the other wireless device received the verifiable acknowledgment message, with the second signed message being transmittable from the other wireless device following a verification of the verifiable acknowledgement message at the other wireless device.

In some variations, an additional apparatus for secure range determination is provided, that includes means for receiving, by a wireless device, a first signed message comprising a first payload transmitted from another wireless device at a first time instance, and received by the wireless device at a second time instance, and means for transmitting at a third time instance, by the wireless device, a verifiable acknowledgement message responsive to the first signed message, with the verifiable acknowledgement message allowing the other wireless device to verify that the verifiable acknowledgement message originated from the wireless device. The additional apparatus further includes means for receiving, by the wireless device, a second signed message transmitted from the other wireless device comprising a second payload with at least timing information for the first time instance and a fourth time instance at which the other wireless device received the verifiable acknowledgment message, with the second signed message being transmittable from the other wireless device following a verification of the verifiable acknowledgement message at the other wireless device.

In some variations, additional non-transitory computer readable media is provided, that is programmed with instructions, executable on a processor, to receive, by a wireless device, a first signed message comprising a first payload transmitted from another wireless device at a first time instance, and received by the wireless device at a second time instance, and transmit at a third time instance, by the wireless device, a verifiable acknowledgement message responsive to the first signed message, with the verifiable acknowledgement message allowing the other wireless device to verify that the verifiable acknowledgement message originated from the wireless device. The additional computer readable media includes further instruction to receive, by the wireless device, a second signed message transmitted from the other wireless device comprising a second payload with at least timing information for the first time instance and a fourth time instance at which the other wireless device received the verifiable acknowledgment message, with the second signed message being transmittable from the other wireless device following a verification of the verifiable acknowledgement message at the other wireless device.

Embodiments of the additional wireless device, the additional apparatus, and the additional computer-readable media may include at least some of the features described in the present disclosure, including at least some of the features described above in relation to the various methods.

Other and further objects, features, aspects, and advantages of the present disclosure will become better understood with the following detailed description of the accompanying drawings.

BRIEF DESCRIPTION OF THE DRAWING

Like reference symbols in the various drawings indicate like elements.

DETAILED DESCRIPTION

Figure 1:
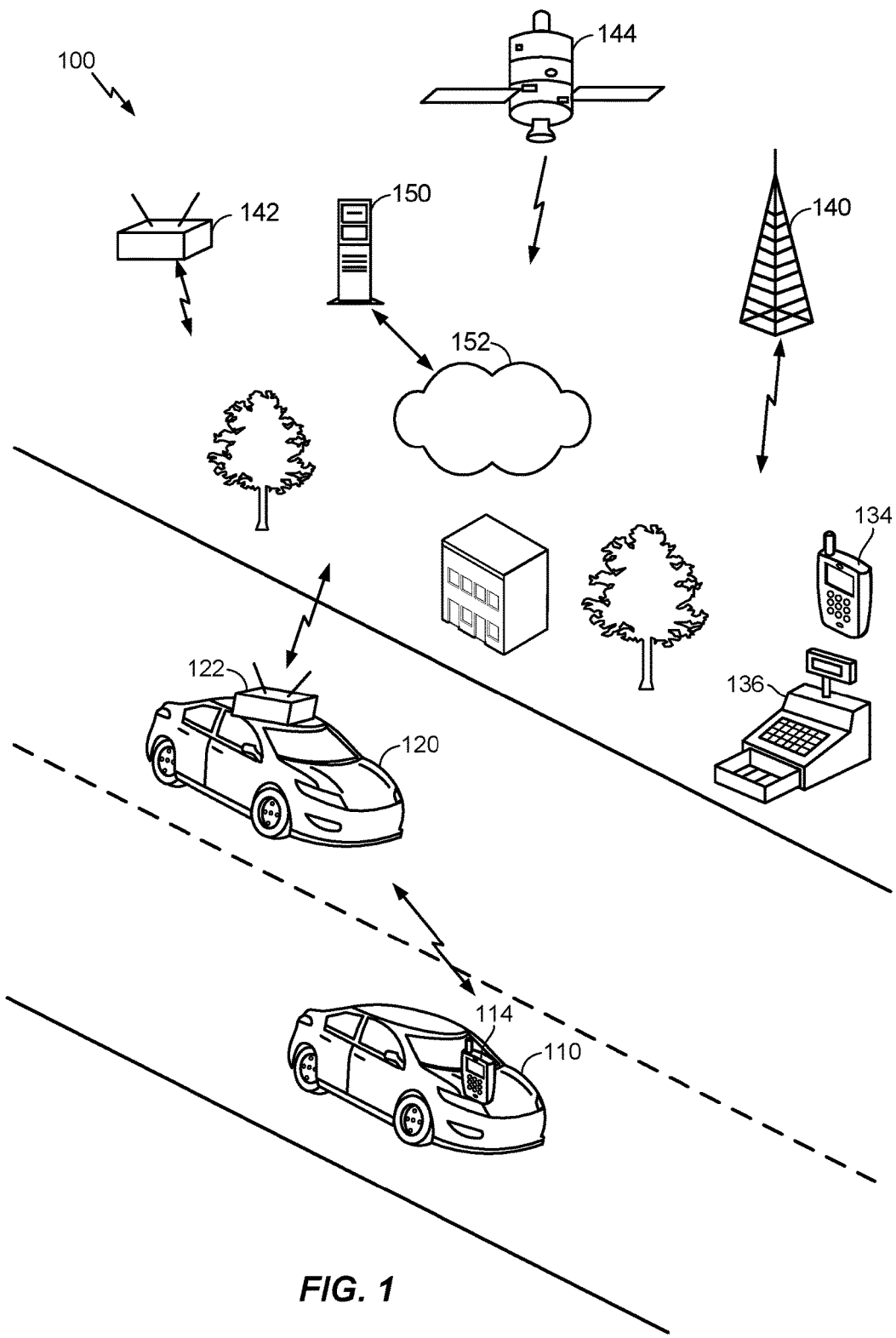
FIG. 1 is a diagram of a system, including stationary and non-stationary wireless devices, to perform secured determination of range between wireless device and/or estimated location for the wireless devices.

Described are implementations for a secure range determination protocol that may augment standard round-trip time (RTT) protocols supported by WiFi systems (e.g., implemented using fine timing measurement (FTM) messaging) with security features to prevent or inhibit RTT inflation and deflation attacks. Time-of-flight measurements can be used to estimate the range, which may be used to compute peer distance estimation between two wireless devices, and may also be used to perform positioning estimation. An RTT-based ranging implementation in WiFi may involve an FTM packet and an acknowledgement (ACK) packet. Some example security features, as will be more particularly described below, include cryptographically signing at least some of the various exchanged messages between two wireless devices, sending two sequential message by one of the mobile devices so that the receiving device can verify that the two sequential messages are received within some expected time period of each other, and/or creating a random delay in the sending of one or more of the exchanged messages. The implementations described herein may be used for packet technologies other than WiFi-based technologies. As will be described in greater details below, a secure range determination protocol (e.g., a secure RTT protocol) may include signed FTM messages sent by a first device (e.g., a responder wireless device) to a second device (e.g., an initiator wireless device initiating a range determination process), and a verifiable acknowledgement message, sent from the second device (the initiator device) to the first device (the responder device), that is configured to allow the responder device to verify that the acknowledgement message was transmitted from a legitimate source.

As will be discussed in greater detail below, one particular way to implement a secure timing protocol is for messages exchanged by the responder and initiator devices to be signed by the respective legitimate peers, with every signed message including a payload data that can be signed (e.g., generate a signature with a hash function that uses the payload of the message, and a secret cryptographic key associated with the device). The payload for every exchanged message may include: a) ID of the message sender (e.g., a media access control (MAC) address), b) timing information (e.g., T1, T2, T3, and/or T4 illustrated in FIG. 2 below), and/or c) a nonce. In some embodiments, the timing information T1 may denote the time the first wireless device transmits a first signed message (e.g., an STM message) to the second wireless device (for the purpose of supporting range calculation by the second wireless device), T2 may be the time epoch the second wireless device receives this STM message, T3 may be the time epoch at which the second wireless device transmits an [S]ACK messages in response to the first wireless device STM message, acknowledging its reception, and T4 may be the time epoch the first wireless device receives the second wireless device acknowledgement. Thus, for example, a responder device (after receiving and FTM Request and acknowledging it), produces a signed TM_1 (STM_1), and sends it to the second (e.g., initiator) device. Upon receiving STM_1, the receiving, second, device verifies the received signature, dropping the message if it fails. If the signature is verified, the second device sends a signed ACK_1 message (or [S]ACK_1). If the second device sent a signed acknowledgement, the first device accepts [S]ACK_1 and records T4. Alternatively, another possible embodiment for a secure RTT protocol may be to send the verifiable acknowledgment message (ACK) with no payload. In this case, a companion timing message, signed by the ACK sender (e.g., the initiator), is sent within a short time of ACK sending, for the purpose of validating the ACK. If the acknowledgement, ACK_1 is unsigned, the first (responder) device accepts it and records T4 only if it also receives STM_1* from the initiator (with a verified signature) within a very short time. After the first (responder) device records T1 and T4, it can send a signed message to the initiator device that includes the values for T1 and T4. In some embodiments, an RTT protocol (e.g., one based on an FTM implementation) may be augmented with a mutual range capability, in which T2 and T3, for example, may be transmitted from the second wireless device (the initiator device) back to the first wireless device (the responder device). Thus, in such embodiments, and as will be discussed in greater detail below in relation to FIG. 2, the timing information T2 and T3 may be included as a payload of the STM_1* message sent back as verification of the ACK message (since T3 is the time of ACK departure, by the time STM_1* is transmitted, this timing information is available).

Thus, described herein are methods, systems, devices, computer readable media, and other implementations, to perform secure range determination, including a method that includes transmitting, by a first wireless device (e.g., a responder wireless device), a first signed message at a first time instance, the first signed message comprising a first payload and configured to be received by a second wireless device (e.g., an initiator wireless device, which initiated the exchange with the first, responder, wireless device) at a second time instance. The method further includes receiving at a fourth time instance, by the first wireless device, a verifiable acknowledgement message, transmitted from the second wireless device at a third time instance in response to the first signed message, with the verifiable acknowledgement message allowing the first wireless device to verify that the verifiable acknowledgement message originated from the second wireless device, and verifying, at the first wireless device, that the verifiable acknowledgement message originated from the second wireless device. The method further includes transmitting, by the first wireless device, in response to a verification that the verifiable acknowledgement message originated from the second wireless device, a second signed message comprising a second payload with at least timing information for the first time instance and the fourth time instance at which the first wireless device received the verifiable acknowledgement message. In some embodiments, receiving the verifiable acknowledgement message may include further receiving, by the first wireless device, subsequent to receiving the verifiable acknowledgement message at the fourth time instance, a further signed message with a further payload from the second wireless device within a threshold time period following the receiving the verifiable acknowledgement message at the fourth time instance, by the first wireless device, with the further signed message being configured to indicate that the verifiable acknowledgement message was transmitted by the second wireless device.

Also disclosed are methods, systems, devices, computer readable media, and other implementations for secure range determination, including a method that includes receiving, by a wireless device (e.g., an initiator wireless device that initiated a communication exchange with a responder device), a first signed message comprising a first payload transmitted from another wireless device (e.g., the responder device) at a first time instance, and received by the wireless device at a second time instance. The method further includes transmitting at a third time instance, by the wireless device, a verifiable acknowledgement message responsive to the first signed message, with the verifiable acknowledgement message allowing the other (responder) wireless device to verify that the verifiable acknowledgement message originated from the wireless device, and receiving, by the wireless device, a second signed message transmitted from the other (responder) wireless device comprising a second payload with at least timing information for the first time instance and a fourth time instance at which the other wireless device received the verifiable acknowledgment message, the second signed message being transmittable from the other wireless device following a verification of the verifiable acknowledgement message at the other wireless device. In some embodiments, transmitting the verifiable acknowledgement message may include producing, at the wireless device (i.e., the initiator), a signed acknowledgement message comprising an acknowledgement payload, and transmitting the signed acknowledgement message. In some embodiments, transmitting the verifiable acknowledgement message may include, for example, transmitting, by the wireless device, the verifiable acknowledgement message after a random delay period following receipt of the first signed message from the other wireless device. In some embodiments, transmitting the verifiable acknowledgement message may include further transmitting, subsequent to the transmitting the verifiable acknowledgement message, by the wireless device, a further signed message with a further payload from the wireless device within a threshold time period following the transmitting the verifiable acknowledgement message, with the further signed message configured to indicate that the verifiable acknowledgement message was transmitted by the (legitimate) wireless device.

The methods, devices, systems, and other implementations described herein may be used to secure WiFi/Bluetooth vehicle entry systems. For example, in a Passive Keyless Entry and Start (PKES) system, WiFi-based car-to-keyfob range detection may be realized via a secure RTT protocol as a pre-requisite to unlock car. In another example, the embodiments described herein may be used in vehicle-to-vehicle communication system to implement secure ranging for collision avoidance and autonomous driving systems. In such implementations the secure RTT protocol may be used to feed distance information to Advanced Driver Assistance Systems (ADAS) to control car trajectory and avoid obstacles. A secure RTT implemented for such applications may also be used for computing rate-of-displacement between two or more vehicles. In yet another example, the embodiments described herein may be used with digital payment systems, e.g., digital wallets, point-of-sale (POS) systems, etc. For example, a near-field communication (NFC) reader to POS target protocol may be implemented using a secure RTT protocol. In such situations, the implementations described herein may be used to prevent/inhibit potential attempts by a rogue party to capture/intercept transmissions from a legitimate party completing a purchase transaction between the legitimate party's mobile device and a first point-of-sale device, in order to use the intercepted transmissions (from the legitimate party) to complete a fraudulent transaction at another point-of-sale by the rogue party (i.e., the rogue party piggy-backs on the wireless transmission between the legitimate party and the first point-of-sale device to complete a different, fraudulent, transaction). By implementing the secure RTT protocols described herein, which inhibits a rogue party's ability to mount a range deflation attack (to cause a device, such as the other point-of-sale device, to compute a range, between itself and the device of the legitimate party, that is different from the true range between the two devices) the risk of successfully completing a fraudulent transaction is reduced.

NFC protocol timeouts may be tuned according to true RTT measurements to avoid relay attacks.

With reference now to FIG. 1, a diagram of an example system 100 that includes multiple wireless devices (which may include a combination of stationary and/or non-stationary devices) to determine range and/or estimated locations of those wireless devices, is shown. In the illustrated example, two vehicles 110 and 120, and two mobile wireless devices 114 and 134 are depicted (the device 114 is illustrated as traveling with the vehicle 110, and the device 134 is illustrated in the vicinity of a point-of-sale device 136, to illustrate potential uses of the secure RTT implementations described herein for driving safety and secure purchase transaction applications), although the systems, methods, and other implementations described herein may be used in conjunction with any number of objects (whether they are moving objects or stationary objects, or some combination thereof) and/or wireless devices. The implementations described herein may be used to determine the range (e.g., distance) between any two wireless devices (whether these devices are stationary devices, or non-stationary devices) in a secure way (e.g., to thwart relay attacks, also referred to as "man-in-the middle" attacks, that can lead to inflated or deflated range determination). In some embodiments, a wireless device 122 (installed on a moveable platform such as the vehicle 120) and a wireless device 142 may include Local Area Network Wireless Access Points (LAN-WAPs) that may be used for wireless voice and/or data communication, and may further be configured to perform the secure range determination processes described herein. The wireless devices 122 and/or 142 may be part of a Wireless Local Area Network (WLAN), and may be further configured to enable communication operations (data and/or voice communication) over smaller geographic regions. Additionally in some embodiments, the wireless devices 122 and/or 142 could also include pico or femto cells. In some embodiments, the wireless devices 122 and/or 142 may be part of, for example, WiFi networks (Institute of Electrical and Electronics Engineers (IEEE) 802.11x), cellular piconets and/or femtocells, Bluetooth® wireless technology Networks, etc. As described herein, in some embodiments, implementations using IEEE 802.11 standard may provide physical layer and media access control (MAC) specifications for WLAN. In addition to the primary use of exchanging information among wireless devices, the technology may be utilized to perform ranging and/or localization through time-of-flight measurements. A variant of IEEE 802.11p provides specifications for wireless access in vehicular environments. This includes data exchange between vehicles and between vehicles and infrastructure. The data exchanges could be utilized to enable ranging among vehicles and ranging and/or localization between vehicles and infrastructure, to implement secure purchase transactions (realized using NFC-based RTT processes) between mobile devices and point-of-sale devices (such as the point-of-sale device 136 depicted in FIG. 1), etc.

The system 100 may also be configured for communication with one or more stationary Wide Area Network Wireless Access Points, such as a WAN-WAP 140 depicted in FIG. 1, which may be used for wireless voice and/or data communication, and may also serve as a source of independent information through which the wireless devices 114, 122, 134, and/or 142 may, for example, determine their position/location. The WAN-WAP 140 may be part of a wireless wide area network (WWAN), which may include cellular base stations, and/or other wide area wireless systems, such as, for example, WiMAX (e.g., IEEE 802.16), femtocell transceivers, etc. Typically, the WAN-WAP 140 within the WWAN may operate from fixed positions, and provide network coverage over large metropolitan and/or regional areas. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a WiMax, and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other radio access technology (RAT). GSM and W-CDMA are described in documents from a consortium named "3rd Generation Partnership Project" (3GPP). Cdma2000 is described in documents from a consortium named "3rd Generation Partnership Project 2" (3GPP2). In some embodiments, 4G networks, Long Term Evolution (LTE) networks, Advanced LTE networks, Ultra Mobile Broadband (UMB) networks, a wireless personal area network (WPAN), and all other types of cellular communications networks may also be implemented and used with the systems, methods, and other implementations described herein. A WLAN may also be implemented, at least in part, using an IEEE 802.11x network, and a WPAN may be a Bluetooth® wireless technology network, an IEEE 802.15x, or some other type of network. The techniques described herein may also be used for any combination of WWAN, WLAN and/or WPAN.

As further shown in FIG. 1, in some embodiments, at least some of the wireless devices (e.g., the mobile wireless device 114 and/or 134, as well as the wireless devices 122 and/or 142) may also be configured to at least receive information from a Satellite Positioning System (SPS) that includes a satellite 144, which may be used as an independent source of position information for the various moving wireless devices. The wireless devices configured to receive and process SPS signals may thus include one or more dedicated SPS receivers configured to receive signals for deriving geo-location information from the SPS satellites. Transmitted satellite signals may include, for example, signals marked with a repeating pseudo-random noise (PN) code of a set number of chips and may be located on ground based control stations, user equipment and/or space vehicles. The techniques/processes provided herein may be applied to, or otherwise enabled for use, in various systems, such as, e.g., Global Positioning System (GPS), Galileo, Glonass, Compass, Quasi-Zenith Satellite System (QZSS) over Japan, Indian Regional Navigational Satellite System (IRNSS) over India, Beidou over China, etc., and/or various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The system 100 may further include a server 150 (e.g., a location server, such as an Evolved Serving Mobile Location Center (E-SMLC) server, or any other type of server) configured to communicate, via, for example, a network 152 (e.g., a cellular wireless network, a WiFi network, a packet-based private or public network, such as the public Internet, etc.), or via wireless transceivers included with the server 150, with multiple network elements or nodes, and/or mobile devices. For example, the server 150 may be configured to establish communication links with one or more of the wireless devices of FIG. 1 (e.g., with any of the devices 114, 122, 134, 140, and/or 142), each of which may be part of the network 152, to communicate data and/or control signals, and receive data (e.g., receive range-data from two wireless devices communicating with each other, based on which range between those two devices may be derived) and/or control signals from the access points. In some embodiments, the server 150 may implement such protocols as Secure User plane Location (SUPL). User plane Location Protocol (ULP), LTE Positioning Protocol (LPP) and/or the LPP Extensions (LPPe) protocol for direct communication and to control and transfer measurements. The LPP protocol is defined by 3GPP, and the ULP and LPPe protocols are defined by the Open Mobile Alliance (OMA). In some embodiments, the server 150 may also be used to facilitate, at least in part, the range determination and location determination operations described herein.

As described herein, each one of the various wireless devices 114, 122, 134, 140, and/or 142 may be configured to perform a secure exchange of wireless communication messages with another of the wireless devices, with at least some of the exchanged communication being configured to protect and inhibit attacks that are based on range-inflation or deflation processes, by, for example, adding cryptographic signatures to those at least some of the exchanged messages in order to authenticate them (e.g., verify that they originated from a legitimate device, thus reducing the ability of a rogue party to transmit messages to cause derivation of a wrong range between the communicating devices). Accordingly, and as will be discussed in greater detail below, any of the wireless devices 114, 122, 134, 140, and/or 142, when responding to a communication exchange intended to trigger a process to derive a range (and/or a location) between that device and an initiating device, may be configured to transmit a first signed message at a first time instance, with the first signed message comprising a first payload and configured to be received by a second wireless device at a second time instance (the signing of the first message may be performed using a hash function applied to a first payload and a secret cryptographic key, associated with the signing device, to generate a signature that can be verified at the receiving device). The device may also be configured to receive at a fourth time instance a verifiable acknowledgement message, transmitted from the second wireless device at a third time instance in response to the first signed message, with the verifiable acknowledgement message allowing the first wireless device to verify that the verifiable acknowledgement message originated from the second wireless device. The first wireless device is configured to then verify that the verifiable acknowledgement message originated from the second wireless device, and, responsive to a verification that the verifiable acknowledgement message originated from the second wireless device, transmit a second signed message comprising a second payload with at least timing information for the first time instance and the fourth time instance at which the first wireless device received the verifiable acknowledgement message. Each of the wireless devices 114, 122, 134, 140, and/or 142 may likewise be configured to perform operations relating to the exchange of communication when acting as the initiating device.

In some embodiments, the messages transmitted by the various wireless devices of FIG. 1 may be configured according to the FTM RTT protocol. Generally, under the FTM protocol, an initiating wireless device may obtain or compute one or more measurements of RTT based, at least in part, on timing of messages transmitted between the initiating wireless device and another, responding wireless device (also referred to as a responder device or a sending STA). In some embodiments, the initiator wireless device may initiate a message exchange transaction with the other wireless device (the responder device) by transmitting a fine timing measurement request (FTMR) message or frame (also referred to as a "Request") to the other wireless device. The initiator wireless device may subsequently receive an action frame or an acknowledgement message (also referred to as "Ack") that is transmitted from the other wireless device in response to the Request. In some embodiments, FTM messages may include a category field indicating the general use for which the FTM message is directed, a public action field holding a value indicating the type of action frame that is to be communicated (and thus the formatting to be followed for the particular action frame specified), and a trigger field to indicate the type of operation the requesting wireless device is asking the responding wireless device to perform. An FTM message may also include a measurement type field, where the measurement type field can include values such as a Location Configuration Information (LCI) value (which can, in some implementations, reflect a request for, in one example, latitude/longitude coordinate values) and/or a Location Civic value. Additionally or alternatively, an FTM message may include a field to define fine timing measurement parameters (including different settings values that are requested by the initiating device and allocated by the responding device).

FTM messages may also include information element fields to hold miscellaneous data (in which the message's payload may be included). Thus, for example, an FTM-based message transmitted by one of a wireless device configured or adapted to implement an FTM-based RTT protocol may include, in one or more such information element fields, timing information and/or identification information (including message sequence numbers) pertaining to the messages exchanged between various wireless devices, based on which the ranges between the devices may be derived. Further details regarding the data included with FTM messages (or with other types of protocol messaging), including timing information relating to the various messages (which may be provided as timestamps collected during a message exchange between two devices) and other data payloads that may be included with the messages (e.g., signature portions attached to at least some of the messages) are provided with respect to FIG. 2.

In a typical RTT-based message exchange (e.g., a non-secure exchange, in which an attack, or a threat of an attack, is not considered), the initiator device may begin the range determination process by sending an RTT measure request (e.g., an FTM Request message in implementation based on an FTM-RTT protocol), and, in response to the request message, the responder device may send an acknowledgement message, followed by, at time T1, a first FTM message (e.g., referred to as FTM_1, which may be an FTM action message). The initiator device receives the FTM message at T2, and sends, at T3 an initiator acknowledgement message that is received by the responder device at T4. Subsequently, the responder device may send to the initiator device a second FTM message (e.g., FTM_2) that includes in its payload timing information (e.g., timestamps) corresponding to the times T1 (at which the first FTM was transmitted) and T4 (at which the acknowledgement message was received). The initiator device (or a remote device, such as the server 150, that is configured to receive time data from the initiator device to compute the range) then computes the range as a function of the T1, T2, T3, and T4, e.g., RTT= (T2−T1)+(T4−T3). Additionally, location estimates for the communication devices may also be derived. It is to be noted that the first two operations (sending the RTT measurement request and the acknowledgement message) are generally performed to establish who the initiator device is, and to ensure that the initiator and responder devices remain awake for the remaining exchange that define the range determination message-exchange process. It is also to be noted that the timing information might be obtained in terms of the local clocks of the wireless devices, and thus it may be appropriate to perform clock adjustment/correlation processes in order to express the timing information in reference to a particular clock or time frame (it is to be noted that because, in some embodiments, clock differences between peer devices are cancelled out when performing RTT protocols, clock adjustment processing may not be required).

As noted, non-secure exchanges may be vulnerable to a relay attack (man-in-the-middle attack). An example of such an attack is an RTT deflation attack, in which the attacker attempts to cause the initiator device to compute a range/distance to the responder attacker that is smaller than the actual range (i.e., to cause the devices to compute range values indicating that the devices are closer to each other than they actually are; this type of an attack is sometimes used to unlock a car by fooling the automatic lock mechanism to determine that the wireless key fob is nearer than it actually is). The goal of an RTT deflation attack is to decrease T2 and T4, and/or increase T1 and T3 (either of which would result in a reduced RTT value). For example, the attacker may try to impersonate the responder device and produce a fraudulent first FTM (corresponding to a later T1 value), a fraudulent initiator acknowledgement message (to be sent to the real responder), and a fraudulent second FTM message, to thus cause a resultant lower RTT than otherwise would have been computed. It is to be noted that impersonation of a peer may be executed even if the peers can authenticate each other, as in the case of key fob/car system. The attacker can simply relay messages back and forth, altering T1-T4 values to skew RTT/range computations.

Figure 2:
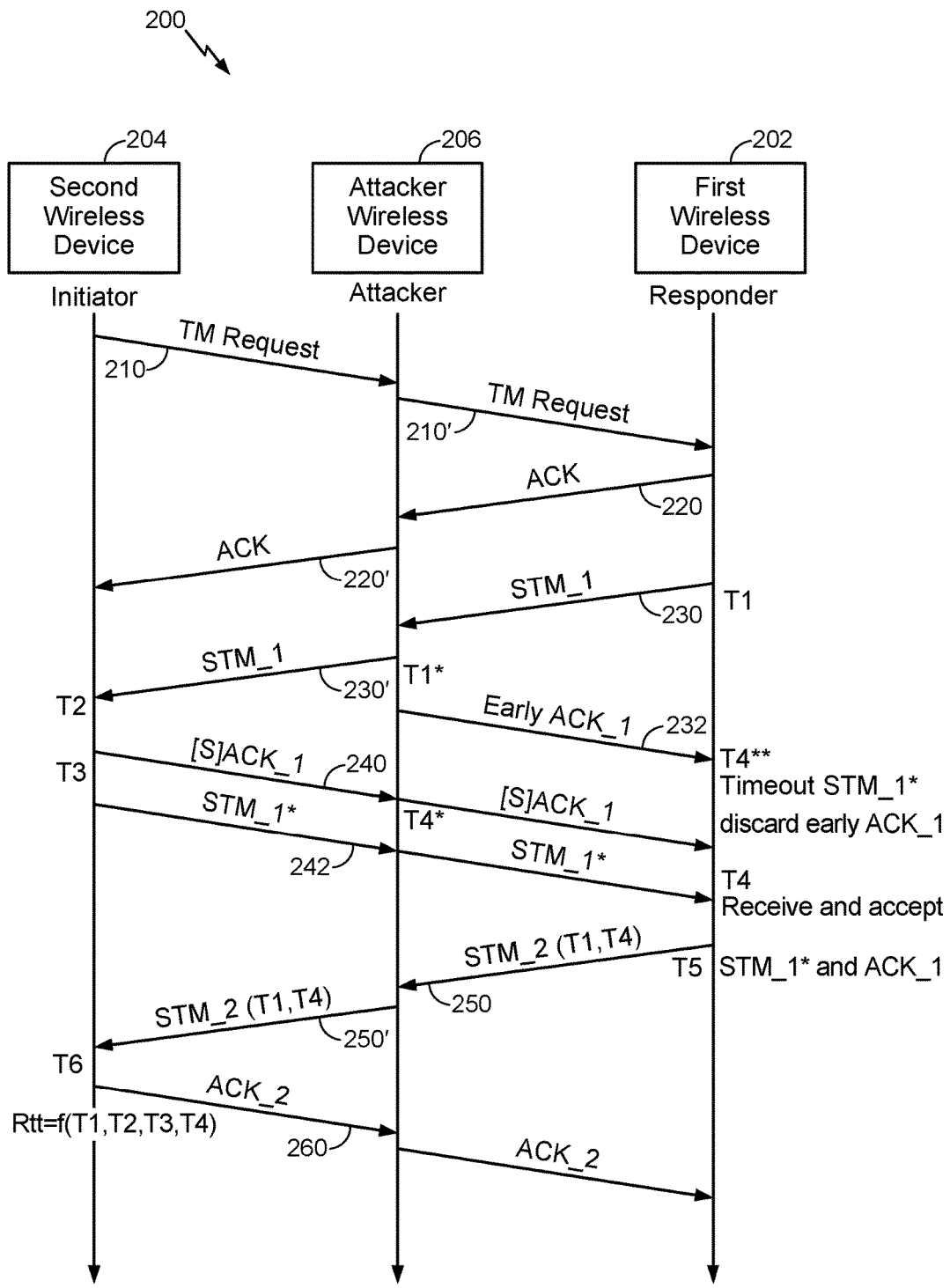
FIG. 2 is a flow diagram of an example communication flow between an initiator wireless device and a responder wireless device to implement a secure range determination process.

Thus, to protect against RTT-based attacks, a secure range determination process is implemented. With reference now to FIG. 2, a flow diagram of a communication flow 200 is provided that depicts an example message exchange configured to facilitate secure range determination between two wireless devices 202 and 204 (either of which may be similar to, in their configurations and/or functionalities, to any of the wireless devices 114, 122, 134, 140, and/or 142 depicted in FIG. 1). The secure message exchange provides information (e.g., timing information) to allow estimating distance or range between the two devices. For the purposes of illustration, the wireless device 202 will be referred to as responder device 202, but could also be referred to as the first wireless device 202, while the wireless device 204 will be referred to as initiator device 204 (which initiates the communication exchange), but could also be referred to as the second wireless device 204. The designation of either the responder or initiator devices as the first or second device may be reversed. In the example illustration of FIG. 2, an attacker device 206 is provided (which may be similar to the devices 202 and 204).

Generally, the initiator device 204 initiates the communication exchange with the responding wireless device 202 via a TM Request message 210 (the TM Request message may conform to the FTM protocol, or may generate, and conform to, some other RTT-based protocol). In the example of FIG. 2, the message 210 is shown as being intercepted by the attacker, who may relay the message (shown as copy message 210') to the responder device 202 (with an added time delay). Alternatively, in some embodiments, the attacker device 206 may block the TM Request message 210, and generate in its place copy message 210' that is transmitted to the responder device 202. Upon receipt of the TM request message (be it the original message 210 or the copy message 210'), the responder device 202 may transmit to the initiator device 204 an acknowledgement (ACK) message 220, which may or may not be intercepted by the attacker device. If intercepted, the attacker device 206 may block the original ACK message 220, relay the message 220 to the initiator device 204 (with an added small time delay), or generate a copy of the original ACK message 220 (shown as the copy message 220'). As noted, the generation and transmission of the TM Request message 210 and/or of the ACK message 220 are, in some embodiments, optional, and generally used to establish which of the devices is the initiator and which is the responder, as well as to configure the devices to be in active mode and to expect (and thus respond to) messages from their counterpart device. While in the example of FIG. 2 the messages 210 and 220 are not depicted as being processed so as to authenticate them (e.g., by adding a signature to the messages), in some embodiments the messages 210 and 220 may be processed in a manner similar to some of the various messages exchanged between the devices 202 and 204, as will be discussed in greater detail below.

Subsequent to the responder device 202 sending the ACK message 220, the responder device 202 sends at time T1 (the time-of-departure, or TOD) a signed message 230, denoted STM_1. The signed message's signature block, included with the STM_1 message 230, is configured to authenticate the responder device 202 as the device from which the message was originated. In some embodiments, the signature block may be generated by using a secret cryptographic key (also referred to as $K_{au}$) when applying a hash function (e.g., SHA-128, SHA-256, or any other type of hash function) to a payload of the message 230. The signed message 230 thus includes a non-signature portion, including a payload, and a signature portion corresponding to a hash value produced via a selected hash function that uses the payload of the message 230 and the secret cryptographic key associated with the signing device (in such embodiments, a dedicated hash function is realized that takes as input the payload of the message and the secret cryptographic key to produce the resultant hash value constituting the signature). A destination device receiving the signed message can verify the received message (e.g., verify that the hash value was in fact produced by the peer device using the data in the payload and using the correct secret cryptographic key). Particularly, the destination device uses a hash function (e.g., same hash function that was used at the source device) to apply it to the received message (including the payload and the hash value produced at the sending device), a cryptographic key available at the source device (e.g., the secret key, if the key used is a symmetric key, or a public key of a public-private key pair if the key used at the source device was an asymmetric key) to obtain a value that indicates whether the received message was generated by the source device (e.g., in some embodiments, application of the hash function to the signature portion, the cryptographic key, and the payload of the received message will produce some pre-determined expected value, such as '0', or some value representative of 'TRUE', if the payload of the message was in fact generated by the legitimate source associated with the cryptographic key applied at the receiving device). If the correct expected value is produced through the verification process applied at the receiving device, the received message is deemed to have been originated from the correct transmitting device (i.e., the payload content was not modified en route to the receiving destination device), and the message is thus authenticated. If the message cannot be verified (the value computed through the verification process at the receiving device does not match the value expected), the received message is not authenticated, and may be discarded (and the range-determination process terminated/aborted). Thus, in such embodiments, a signature verification function at the receiving/destination device may be applied to the signature, Sign(M), provided with the received message, and a verification key (a public key, pub Ver, for an asymmetric cryptographic key-pair, or a secret key for a symmetric cryptographic key), that will output, for example, a value TRUE (or some other representative value) if the signature was computed correctly, at the sending end, with the secret key associated with the sending device, or FALSE, otherwise. In some embodiments, the verification process implemented at the sending and receiving devices may include computing a hash value at the sending device using only the payload, signing the produced hash value using the secret key of the sending device, and sending the signed message comprising the payload and the cryptographic signature. In such embodiments, at the receiving device, the corresponding key associated with the sending device (a public key if a private key of an asymmetric private-public key pair was used by the sending device, or the secret key if a symmetric key was used) is applied to the signature to produce a hash value, and the hash function is applied to payload to independently compute from the payload of the message the hash value. If the independently computed hash value matches the decrypted hash value, the received message is deemed to have been authenticated. In some embodiments, signing operations may be implemented through multiple applications of hash functions (e.g., producing a first hash value from a data payload, and applying a hash function to that first hash value and a secret key to produce a resultant signature hash).

As noted, in some embodiments, the secret cryptographic key used by the responder device 202 to perform signature verification processes may be a symmetric key (e.g., an Advanced Encryption Standard (AES) key, or any other type of a symmetric cryptographic key) that is securely provided to both of the devices 202 and 204 (a symmetric key is used for encryption and decryption). The secured distribution mechanism of symmetric keys would need to safeguard that such keys cannot be provided a rogue third party trying to mount a man-in-the-middle attack. Alternatively, the secret cryptographic key used for the verification processes described herein may be a private key of an asymmetric public-private key-pair, such as Elliptic Curve Digital Signature Algorithm (ECDSA) keys) in which the signing device (for example) has been provided with the secret private key, and the corresponding public key can be obtained by other devices (including, in this case, the initiator device 204) to allow performance of secure operations with the device in possession of the private key of private-public cryptographic key pair (the public key can be obtained, for example, from a server(s) maintaining a repository of public keys for various devices).

As noted, to generate a signature block for the signed message STM_1 230, a hash function is applied to the payload of the message to be transmitted. The payload (which may be included, for example, in information element fields of an FTM-based message) may include one or more of: a MAC address of the transmitting/sending device (e.g., the responder device 202 in the case of the message 230), some other device identifier associated with the transmitting device (e.g., some unique network address), a MAC address of the destination device (the initiator device 204, in the case of the message 230), some other device identifier associated with the destination device (e.g., a unique network address), and/or a nonce. A nonce is generally a varying, non-constant, value that varies from one transmitting message to another. Inclusion of a nonce as part of the payload may be used to inhibit or otherwise prevent an attacker device from keeping and using copies of previously intercepted messages, and substituting (i.e., recycling) one or more of those previously intercepted messages for a current message that is currently transmitted by one of the legitimate devices. That is, if the nonce value included in the payload of the a message changes for each message payload sent by a particular device, then the hash value generated for that message will also change, and an intercepting device would thus not be able to recycle previously transmitted messages (with different hash values) that it intercepts.

An example of a nonce that may be used to construct a payload is a changing sequence number that may vary (e.g., increase or decrease) for every subsequent message or RTT transaction (e.g., RTT exchange round). Thus, in every message exchange or RTT protocol round between two communicating devices (e.g., the devices 202 and 204 of the example of FIG. 2), a new sequence, with a corresponding sequence starting value, may be established. The starting value may be established according to some pre-determined formulation (e.g., based on the MAC addresses of the communicating devices and/or the date and time at which the message exchange is initiated), or, alternatively, it may be a random value generated by one of the devices (e.g., by the initiator or responder devices), and included in the payload of the transmitted messages. A sequence-based nonce value can be used to determine if there have been any replay of messages exchanged. For example, if one of the received messages in an exchange includes an unexpected nonce value (e.g., higher or lower than what would be expected if the nonce values were simply to be incremented/decremented, or otherwise modified, from what the previous nonce value was in the previous message or RTT exchange round), this may indicate that the exchange has been disrupted in some way, and thus the information in the messages exchanged (e.g., for the purposes of range computation) may be disregarded.

Thus, the signed TM message 230 may be generated by the responder device to include a payload comprising one or more device identifiers (e.g., MAC addresses for one or more of the communicating devices) and/or a nonce (such as a varying sequence value, that changes its values in some pre-determined manner between sequential messages in the message exchange between the communicating devices). The payload content is used as input to a hash function that, together with a cryptographic key, produces a hash value that can be verified to be generated by a peer in possession of the correct cryptographic key, and no other entity, to thus produce the signature portion for the TM message 230. It is to be noted that the STM_1 message will generally not include timing information corresponding to T1, because T1 may not be known with sufficient precision at the time the message is transmitted (i.e., the time T1, at which the message is radiated from the antenna of the device 202, may not be known until the message is actually transmitted via the antenna).

The signed TM message 230 is thus transmitted to the initiator device 204 (the message 230 may be a broadcast or unicast message, and may identify the initiator device 204 as the destination device, e.g., based on a destination device identifier in the payload portion of the message 230, or in one of the control fields of the message 230). As depicted in FIG. 2, to perpetrate an attack (e.g., a deflation attack, aimed at decreasing T4, for example) the attacker device 206 may seek to impersonate the initiator device 204, and therefore, once it intercepts the message 230 at T1*, it may cause the transmission of a fake early acknowledgement message 232 (denoted in FIG. 2 as Early_ACK_1) to the responder device 202, which, in turn, would cause recordation of an earlier time-of-arrival (marked in FIG. 2 as T4**) for the acknowledgement message the responder device 202 is expecting to receive from the initiator device 204. Subsequently, if the responder device 202 was to send to the initiator device timing information comprising the earlier T4 time, the computed RTT would be smaller than if a later T4, corresponding to a legitimate acknowledgement message from the initiator device 204, was recorded at the responder device.

With continued reference to FIG. 2, when the initiator device 204 receives the signed TM message 230 (or a relayed copy message 230' of the signed TM message), it verifies the authenticity of the message by verifying the signature of the received message, using a cryptographic key associated with the sending peer (e.g., using a previously provided secret symmetrical key that was used by the responder device to generate the hash value of the signature portion of the signed message, or by using a public key corresponding to a secret private asymmetrical key that may have been used by the responder device) to derive a resultant value (that can be compared to an expected value that would be produced if the received message was properly authenticated). If the derived value resulting from the verification operations performed at the receiving device (e.g., the initiator device 204, in this example) match the value expected for a properly authenticated received message (e.g., a value such as '0', 'TRUE', or some other pre-determined expected value), this would indicate that the received message (which arrived at the initiator device 204 at T2) did in fact originate from the responder device 202 (an attacker device would not be able to create a fake signature portion because it presumably would not have the secret key required to produce a valid signature from the message's payload). Otherwise, if the verification process does not produce the correct expected value, the initiator device may discard the received signed TM message and/or abort or terminate the range determination process. As noted, to avoid situations where an attacker device attempts to spoof messages from the responder device by recycling previously intercepted legitimate messages, the message's payload may include a varying nonce value, such as a varying sequence value. If the initiator device determines that the nonce value is inconsistent with an expected nonce value (e.g., the initiator expects a sequence value of '10' but instead determines that the received payload includes a sequence value of '5'), here too the initiator device may discard the received message and/or abort or terminate the range determination process.

To counteract the possibility of an attacker, such as the attacker device 206, intercepting the first signed FTM message from the responder device (i.e., intercepting the message 230 of FIG. 2), and causing an earlier time-of-arrival time instance, T4** (recorded at the responder device 202) from being used for RTT computation, the communicating devices 202 and 204 are configured to use a verifiable acknowledgement message that is configured to allow the responder device 202 to verify that the verifiable acknowledgement message originated from the second, initiator, device 204. That is, if the attacker device, or some other intermediary device, intercepts the verifiable acknowledgement message, the receiving device, in this case the responder device, can still determine whether the verifiable acknowledgement message was in fact generated by, and transmitted from, the initiator device 204.

In some embodiments, a verifiable acknowledgement message may be implemented by producing, at the initiator wireless device, a signed acknowledgement message that includes an acknowledgement payload, and transmitting, at time instance T3, the signed acknowledgement message to the responder device. Particularly, upon receiving at time T2 the signed TM message 230 (or copy message 230', if the message transmitted by the responder device 202 was intercepted and relayed by an intermediary device such as the attacker device 206), and authenticating the signed TM message 230 or copy message 230', the initiator device 204 generates an acknowledgement message 240 (denoted in FIG. 2 as [S]ACK_1, with the notation '[S]' indicating that the acknowledgement may optionally, but not necessarily, include a signature) that may include an acknowledgement message payload. The acknowledgement message payload may include such information as identifiers, such as a MAC address or some other network address, associated with one or more of the communicating devices (e.g., the devices 202 and/or 204), which can also serve to identify the source and/or destination devices associated with the signed acknowledgement message. Alternatively and/or additionally, the acknowledgement message payload may include acknowledgement timing information associated with the verifiable acknowledgement message (such as, for example, timing information associated with acknowledgement message 240), the first signed message (such as, for example, signed TM message 230), or both. Alternatively and/or additionally, the acknowledgement message payload may include a nonce value (e.g., a varying value) such as a varying sequence number that is derived in some pre-determined manner. For example, if the signed TM message 230 (or the copy message 230') received at T2 includes the current sequence value, the subsequent sequence value nonce, to be included in the acknowledgement message payload, may be derived according to some pre-determined formulation (e.g., incremented by 1). This varying nonce value can thus also facilitate tracking any message exchange interruption (i.e., if the nonce value expected at the receiving device is different from what the nonce value included in the message that device receives). Other types of nonce values, including pseudorandom values, or other varying values that can be computed in some predictable way, may be used. In some embodiments, the acknowledgement message payload may also include timing information such as the time instances T2 and/or T3 (if available).

Once the acknowledgement message payload is produced, a hash function (e.g., SHA-256 or some other hash function) may be applied to the payload, together with a secret cryptographic key associated with the initiator device (the secret cryptographic key may be a symmetrical key, which may be the same or different from a symmetric key used by the responder device, or it may be a private key of a public-private key pair uniquely generated for the initiator device) to produce a resultant hash value (corresponding to the "signature" of the message). The generated hash value corresponds to the signature portion for the message, and is added thereto. The signed acknowledgement message would then be transmitted to the responder device. If the responder device 202 cannot verify/authenticate the acknowledgement message, the acknowledgement message is discarded (and thus the RTT and range computation may be terminated/aborted). Alternatively, the responder device may continue with the protocol call-flow, in a non-secure RTT computation mode. The purpose of continuing a possibly non-secure RTT exchange may be, for instance, to alert the initiator device that an attack or malfunction may have taken place (as opposed to a protocol termination due to the communication link being broken). Another reason to continue the possibly compromised RTT exchange may be to provide a non-secure RTT estimate to the initiator, which it then may, or may not, use it at its own discretion.

In some embodiments, the use of a verifiable acknowledgement message may be implemented without signing the acknowledgement message (this would avoid the overhead associated with signing/authenticating messages to be transmitted by the initiator device). For example, a verifiable acknowledgement message implementation may, in such embodiments, include transmitting at time T3, by the initiator device, a non-signed acknowledgement message (as noted, in FIG. 2, the message 240 is used to represent a signed or non-signed acknowledgement message, with the notation '[S]' indicating the option of signing or not signing the acknowledgement message) after a random or a pseudorandom delay period following receipt, at T2, of the signed TM message 230 (or copy message 230') originating from the responder device. The use of a random delay between T2 and T3 would result in a random interval of (T3−T2). Suppose, when a random delay implementation is used, that the attacker device 206 is attempting to send an earlier acknowledgement message (such as the Early ACK 1 message 232 depicted in FIG. 2, resulting in an earlier T4 (T4) time instance. Subsequently, upon receiving a second TM message (e.g., a signed TM message STM_2, marked as a message 250, that is transmitted by the responder device 202), the RTT would then be computed according to RTT= (T4−T1)−(T3−T2). If the value (T3−T2) is large enough (due to the random delay element introduced to delay the time-of-departure of the acknowledgement message [S]ACK_1 to the responder device), the RTT computed may become negative, which would then alert the initiator that there is a potential attack (the initiator device would infer that the negative derived value for RTT corresponds to some malfunction or an attack). Although the random delay can be arbitrary, it would generally need to be capped for practical purposes. It should be noted that, in some situations, if the attacker device 206 can guess the random delay (i.e., guess when ACK_1 is to be generated), then the attacker device may issue and control the transmission of its spoofed Early ACK_1 message 232 to the responder device 202 so that a subsequently derived value RTT (computed as (T4**−T1)−(T3−T2)) would yield a positive (i.e., non-negative) result, which may cause the initiator device to not be alerted of the possibility of the attack. However, a successful attack would, under these circumstances, depend on the attacker device's ability to guess the extent of the random delay applied by the initiator device before transmitting the acknowledgement message [S]ACK_1 message 240 (it is to be noted that successful guessing may depend on quality of the initiator random number generator). Therefore, in some embodiments, several message exchange sequences between the responder and initiator device can help to ensure that a non-negative RTT value is computed for all these separate RTT exchange sequences. That is, random delay mitigation may use multiple rounds of RTT measurements, with probabilistic security guarantees only.

Figure 3:
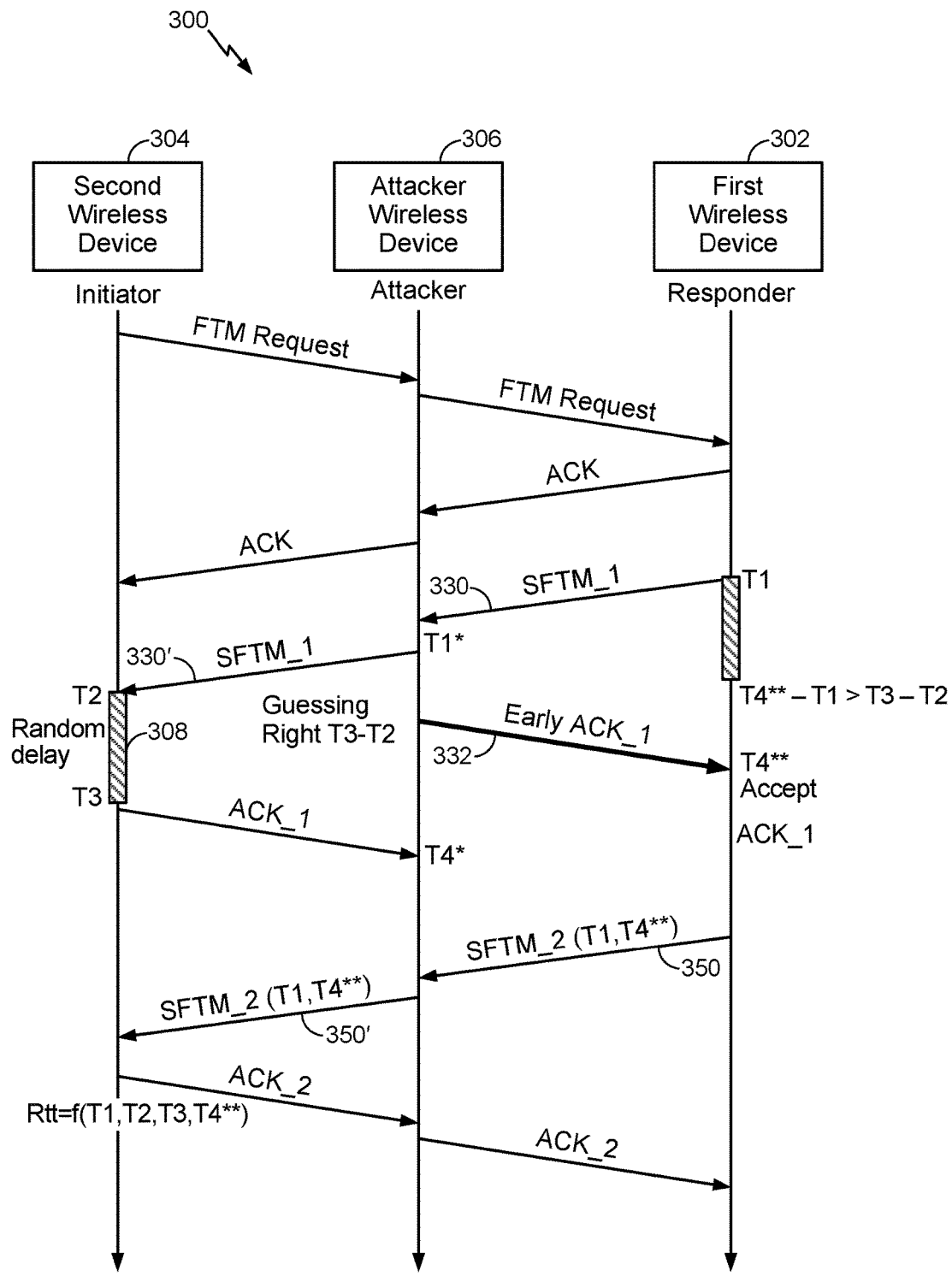
FIG. 3 is a flow diagram of a random delay probabilistic authenticated RTT protocol.

To further illustrate the use of a random (or pseudo-random) delay to mitigate, for example, a WiFi deflation attack, reference is made to FIG. 3 showing a random delay probabilistic authenticated RTT protocol 300. The protocol depicted in FIG. 3 is realized using a WiFi-based FTM RTT protocol, although other RTT-type protocols may be used (such as the RTT protocol of FIG. 2 which uses generic timing measurements (TM) messages). As illustrated, upon receiving an STM_1 message 330 or 330' (which may be similar to the message 230 or copy message 230' of FIG. 2), an initiator device 304 (which may be similar to the device 204 of FIG. 2) determines a random (or pseudo-random) delay period 308, corresponding to the difference between T3 and T2 (i.e., T3−T2). Assume a situation in which an attacker 306 is attempting to send an earlier ACK_1 message 332, in order to cause a responder device 302 (which may be similar to the device 202 of FIG. 2) to determine an earlier T4 (T4) time instance. The responder device 302 would then generate an earlier signed FTM message (SFTM_2) 350 (which may be similar to the message 250 configured according to the TM protocol depicted in FIG. 2) that includes the earlier timing information T4, causing the initiator device 304, upon receiving the SFTM_2 message 350 (or a copy message 350') to compute the RTT according to: RTT=(T4**−T1)−(T3−T2). As noted, if T3−T2 is large, the RTT computed may become negative, which would alert the initiator device not to trust the measurements. If the attacker correctly guesses the random delay (i.e., when ACK_1 is about to be generated (T3)), then the attacker may issue an early ACK_1 to the responder device and the attack may then not be detected by the initiator device upon RTT computation. As also noted, successful guessing may depend on the quality of the initiator device's random number generator, and random delay mitigation may use multiple rounds of RTT measurement, with probabilistic security guarantees only.

Turning back to FIG. 2, another example implementation based on using a non-signed verifiable acknowledgement message includes transmitting, by the initiator device 204, subsequent to the transmitting the non-signed verifiable acknowledgement message, a further signed message (e.g., STM_1* message 242 in FIG. 2), also referred to as a signed confirmatory message, with a further payload from the responder device 202. That confirmatory message is transmitted within a pre-determined/known threshold time period following transmission of the verifiable acknowledgement message. The further signed message (which would be transmitted at a recorded time instance T3 that follows the transmission of the non-signed acknowledgement message) is configured to indicate that the verifiable acknowledgement message was in fact transmitted by the initiator wireless device. In such embodiments, the responder device 202, which is configured to expect and receive an acknowledgement message (responsive to the signed TM message 230 it transmitted at T1), is further configured to receive and expect the signed message 242 sent subsequent to the receipt of a non-signed acknowledgement message. If the responder device 202 does not receive, within the pre-determined time period following receipt of the non-signed acknowledgement message, the further signed TM message 242 (the responder device is configured to determine, based on the signature portion of the STM_1* message 242, whether the message originated from the initiator device), the earlier received non-signed acknowledgement message may be deemed to not have been verified, and the RTT process may be aborted/terminated. Thus, for example, if the responder device had received a non-signed acknowledgement message from an illegitimate source, unless the responder device 202 also receives within a pre-determined period of time a confirmatory signed TM message from the initiator device, the RTT-based message exchange between the responder device 202 and initiator device 204 will be aborted, and the RTT (and the range/distance between the two devices) will not be computed.

In embodiments in which a non-signed acknowledgement message is followed by an initiator-device-based signed TM message 242, the message 242 is produced, for example, by generating a message payload (which, as with the other signed messages of FIG. 2, may include device identifiers, such a MAC addresses for the initiator and/or responder device, and/or a nonce value), applying a hash function to the generated payload using a secret key associated with the initiator device to generate the resulting hash. The resultant hash is added as signature portion of the signed TM message 242. Other ways to generate the signed TM message 242 may also be used.

With continued reference to FIG. 2, with the initiator device 204 having generated the verifiable acknowledgement message (which may be a signed acknowledgement message, a non-signed acknowledgement message sent after a random delay following receipt of the first signed TM message from the responder device, and/or a non-signed acknowledgement message that is accompanied by a further signed TM message generated and sent by the initiator device 204), the responder device 202 is configured to receive and process the verifiable acknowledgement message. Responsive to the verifiable acknowledgement message, the responder device either discards the verifiable acknowledgment message and/or aborts the current message exchange sequence (if it determines that the verifiable acknowledgment message may be an illegitimate message produced and sent by an attacker), or, if the verifiable acknowledgement message is deemed to be a valid message, the responder device 202 produces and transmits a second responder-based signed TM message that includes, as part of its payload, timing information relating to T1 (time-of-departure of the first signed FTM message 230), and T4, which is time of arrival of the verifiable acknowledgement message (and/or the accompanying signed initiator-based signed TM message in embodiments in which such an accompanying message is used). Alternatively, in the event of a verification failure, the responder device may be configured to continue with the call flow (i.e., even if message verification failed), but alerting the initiator that the RTT to be computed may be non-secure or invalid (for instance, the responder may send STM_2 with values of T1 and T4 values that result in negative RTT computation, e.g., the value of T1 transmitted in STM_2 may be negative).

More particularly, assume a situation where the attacker device 206 has intercepted the first signed timing measurement signal STM_1, and has transmitted to the responder device 202 the spoofed early acknowledgement message (Early ACK_1) 232 (presumably, the attacker would not send a signed message, because it does not have the appropriate secret key). In this situation, because the Early ACK_1 message 232 is not followed, within some pre-determined time period, with a confirmatory signed message (such as the message STM_1* 242), the responder 202 determines that the Early ACK_1 message 232 is an invalid/illegitimate acknowledgement message, and accordingly disregards or discards the message. The responder 202 may also terminate the exchange, or may wait for some period of time to see if a legitimate acknowledgement signal, responsive to the STM_1 message 230 it transmitted to the initiator 204, is received.

As noted, in some embodiments, implementations of a verifiable acknowledgement message may be such that acknowledgement messages are sent, by the initiator device, within a pseudorandom delay (from the time of receipt of the message 230 at the initiator device 204) that can be predicted by the responder device 202. Thus, if the acknowledgement message is received at a time instance different than the approximate expected time (some tolerance level can be factored in to the computation of when the acknowledgement message should have been received at the responder device 202), the responder device may deem such an acknowledgement message to be invalid, and therefore may discard or disregard it.

If the verifiable acknowledgement message is implemented as a signed message (such as the signed message [S]ACK_1 240), the responder device is configured, upon receiving the acknowledgement message, to verify the signed message (using a secret symmetric key that is the same as the key used by the initiator device, or using, for example, a public key corresponding to the private key used by the initiator device) to obtain a resultant received hash value. If the resultant received hash value matches an expected hash value (e.g., in some embodiments, application of a hash function to the received payload, a valid signature portion (that was generated using a legitimate secret key by the sending device), and a corresponding cryptographic key, would result in an expected value of '0', TRUE, or some other pre-determined expected value), the signed acknowledgement message is deemed to be valid, and the responder device can continue the message exchange with the initiator device. If the expected and computed resultant hash values corresponding to the received signed acknowledgement message do not match, the signed acknowledgement message is deemed to be invalid (the responder device may then terminate the message exchange process with the initiator device).

Continuing with FIG. 2, if the responder device 202 determines that the verifiable acknowledgement message 240 it received is a valid acknowledgement message (i.e., a signed confirmatory message is received within a pre-determined time period following receipt of the acknowledgement message, or the resultant hash value derived for the received acknowledgement message's hash value matches the correct expected value), the responder device 202 is configured to generate a second signed message 250 (denoted as STM_2). The second signed message 250 includes a payload comprising of at least timing information relating to T1 (namely, the approximate or exact time-of-departure of the first signed timing measurement message 220) and T4 (the time of arrival of the verifiable acknowledgement message 240, or the time of arrival of the confirmatory signed message 242, if the initiator device generated a confirmatory message). For example, the timing information may be represented as timestamps of the local clock of the responder device 202, as timestamps of some reference clock (used by some remote device), or based on some other representation of time. In some embodiments, the payload may further include additional data, such as identifiers of the devices (e.g., MAC addresses or network addresses for the responders and/or initiator devices), and/or a nonce value (e.g., an updated value for the sequence value that was used in the payload for the message 220 and/or the messages 240 and 242). Once the payload for the message 250 is determined, the responder device 202 generates a signature portion for the message 250. For example, the responder device uses a hash function (which may be the same as, or different from the hash function used for the first signed message 230) applied to the payload and the cryptographic key of the responder device to generate a hash value, constituting the signature. The message 250 (including the payload, the signature portion, and any other control signaling) is transmitted to the initiator device 204, at T5, to complete the message exchange between the initiator and responder devices, based on which the range between the two devices can be derived.

As depicted in FIG. 2, the initiator device 204 receives, at T6, the signed message 250 (or a relayed copy 250' of the signed message 250, which may have been intercepted and relayed by an intermediary device, such as the attacker device 206). Here too, the initiator device 204 is configured, upon receipt of the message 250 (or 250'), to authenticate the message 250 (i.e., verify the correctness of the hash value in the payload using the peer cryptographic key.)

If the message 250 or 250' has been verified (i.e., is deemed to have originated from the responder device 202), the initiator device can determine (extract) the timing information providing in payload of the message 250 to determine T1 and T4. The initiator device can then determine the RTT as a function of (T1, T2, T3, and T4), with T2 being the time-of-arrival of the message 220 (or copy message 220') previously measured and recorded by the initiator device, and T3 being the time of departure of the verifiable acknowledgement message (or, alternatively, of the confirmatory signed message 242). For example, in some embodiments, RTT may be computed according to (T2−T1)+(T4−T3). The range can then be derived based on the computed RTT (e.g., as function of c*RTT/2, where c is the speed of light) Thus, in some embodiments, the initiator device is configured to, in response to receiving the second signed message, to determine T1 and T4 from the timing information included in the payload of the second signed message, and determine a range between the initiator device and the responder device based, at least in part, on the determined time values for the first time instance (T1) and the fourth time instance (T4) (in some embodiments, the determination of the range may be performed at some remote device, such as the remote server 150 of FIG. 1, to which the initiator device sends the timing information corresponding to T1, T2, T3, and T4). The initiator device may, in some embodiments, transmit to the responder device, in response to receiving the second signed message, a second acknowledgement message 260 (denoted ACK_2).

Additionally, in some embodiments, the range data derived through the message exchange processes described herein may also be used to determine approximate location for one or more of the communicating devices. For example, the initiator device may use multiple determined range values between itself and one or more responder devices to determine (based further on a determined location for at least one of the one or more responder device) an approximate or exact location. The location information for the at least one of the one or more responder devices may be an established known location (e.g., for a responder device that is a stationary access point or a base station), or the responder device may have independently been able to determine its location (based on wireless signals it received from multiple nodes, such as terrestrial and satellite nodes) according to, for example, multilateration-based computation procedures, or other types of location-determination techniques.

Figure 4:
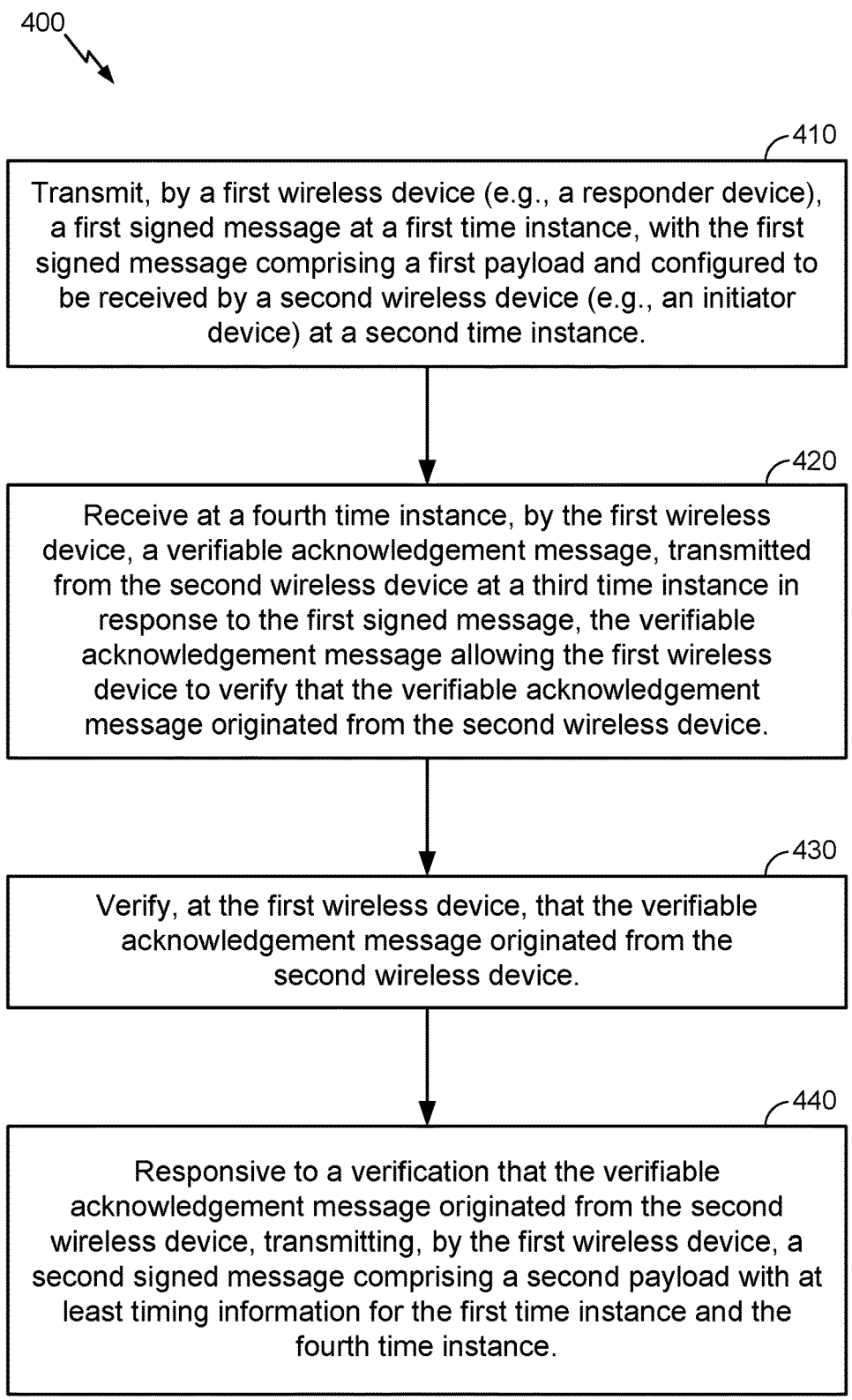
FIG. 4 is a flowchart of an example procedure for secure range determination, generally performed at a responder wireless device.
Figure 6:
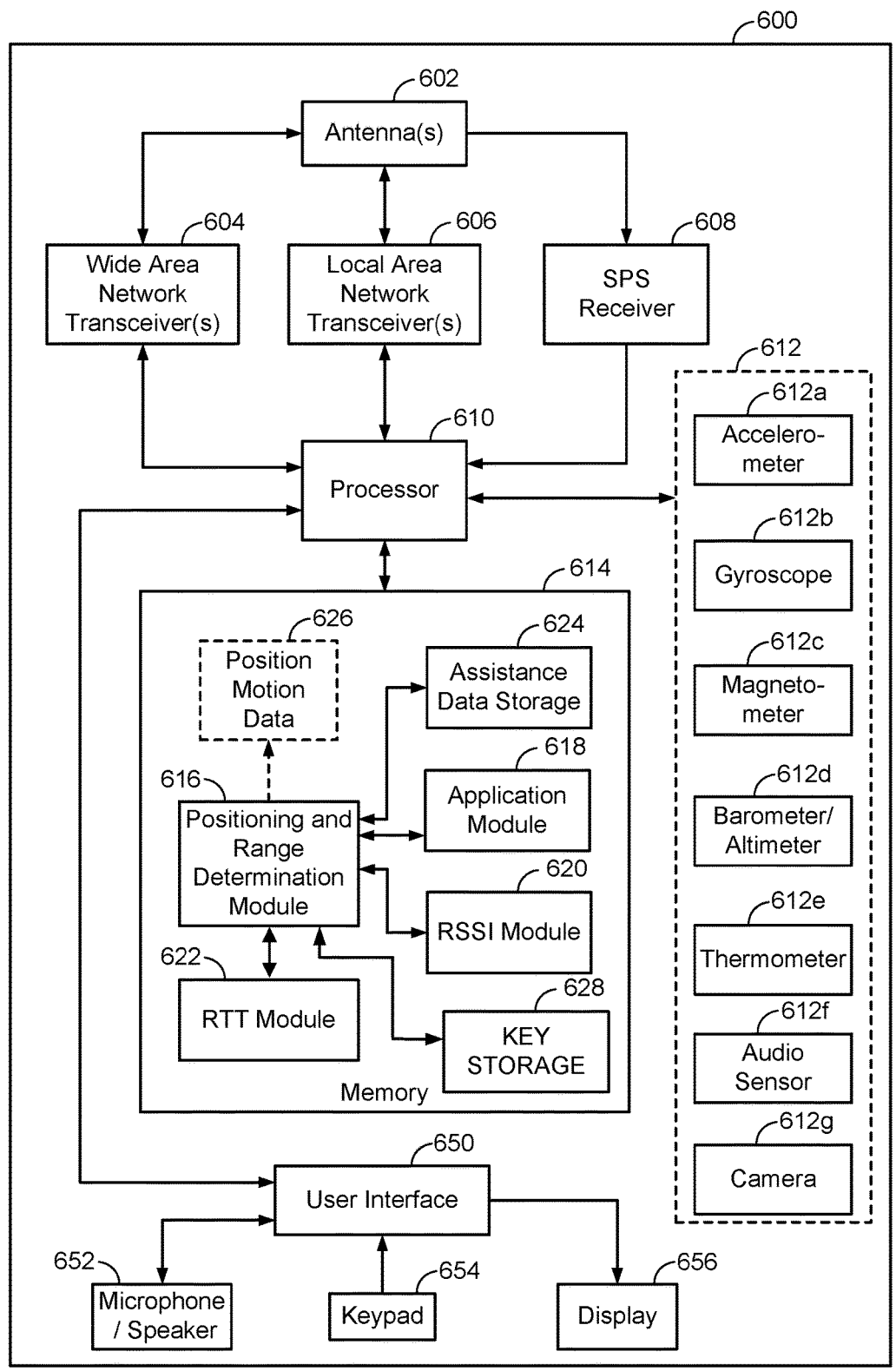
FIG. 6 is a schematic diagram illustrating various components of an example wireless device.

With reference now to FIG. 4, a flowchart of an example procedure 400 for secure range determination, generally performed at a responder device (such as the responder device 202, which is referred to herein, with respect to FIG. 4, as a first wireless device) is shown. The first, responder, device may be a mobile wireless device (e.g., a smartphone, or a computing device installed on a moving platform (such as a vehicle), or may be a stationary wireless device (such as a processor-based access point or base station). The procedure 400 includes transmitting 410, by the first wireless device (i.e., the responder device 202 of FIG. 2), a first signed message at a first time instance (e.g., the time instance T1 of FIG. 2), with the first signed message comprising a first payload and configured to be received by a second wireless device (e.g., an initiator device, such as the initiator device 204 of FIG. 2) at a second time instance (e.g., the time instance T2 of FIG. 2). The first signed message may be transmitted in response to an initial request (e.g., a timing measurement request message) sent by the initiator device. In some embodiments, the first signed message may be transmitted subsequent to an acknowledgement message sent by the first, responder, device. Means for performing block 410 can include, for example, any combination of processor 610, wide area network transceiver(s) 604, and/or local area network transceiver(s) 606 as illustrated in FIG. 6.

As noted herein, the first signed message may be part of a message exchange (e.g., where the various messages are generated and configured according to, for example, an FTM-based RTT protocol). The RTT protocol may be performed using a radio technology comprising one or more of Bluetooth, NFC, or WiFi. However, other RTT protocols may be used to generate the messages. The first payload may be constructed to include one or more of, for example, a first identifier associated with the first (i.e., the responder) wireless device, a second identifier associated with the second (initiator) wireless device, and a respective nonce value. As noted, the identifiers may include a media access control (MAC) addresses associated with the respective devices, or may be some other types of network addresses assigned to the devices. The nonce value that may be included in the first payload (and/or subsequent payloads used with subsequent messages) may be some unique value that generally varies between consecutive transmitted message, or between RTT exchange rounds, so as to avoid/inhibit a possible attack in which an attacker (such as the attacker device 206 depicted in FIG. 2) can recycle and re-transmit previous messages it has previously intercepted. That is, the two devices are configured to keep track of what nonce values have been previously used, so that if the same nonce value is re-used (within some period of time), it would indicate that the received message may be invalid. In some embodiments, the nonce value used may be randomly (or pseudo-randomly) generated. Alternatively, the nonce value may be a varying sequence number that is synchronized at specific times (e.g., outside of the RTT protocol). It is to be noted that the payload for the first signed message (or for any of the other messages exchanged) may be generated as soon as the device identifiers and other payload information (e.g., the nonce value) are known.

As also described herein, once the message payload is generated, the signature portion of the signed message can be generated using a hash function, the payload of the message and the first device's secret cryptographic key. The secret cryptographic key may be a symmetric key (in which case, the same key would need to be securely provided to the other, initiator, device), or may be the private key of a public-private asymmetric key pair.

With continued reference to FIG. 4, the procedure 400 further includes receiving 420 at a fourth time instance (e.g., corresponding to the time instance T4 of FIG. 2), by the first wireless device, a verifiable acknowledgement message (e.g., the message 240 of FIG. 2), transmitted from the second wireless device at a third time instance (e.g., at T3 of FIG. 2) in response to the first signed message, with the verifiable acknowledgement message allowing the first wireless device to verify that the verifiable acknowledgement message originated from the second wireless device. Means for performing block 420 can include, for example, any combination of processor 610, wide area network transceiver(s) 604, and/or local area network transceiver(s) 606 as illustrated in FIG. 6.

As described herein, in some embodiments, the verifiable acknowledgement message may include a signed acknowledgement message, with a payload including one or more of, for example, the first identifier associated with the first wireless device, the second identifier associated with the second wireless device, timing information associated with the acknowledgement message (e.g., timestamp of T2, which corresponds to the time at which the first signed message arrived at the initiator device, or a timestamp for T3, which may be an approximation of the time-of-departure for the signed acknowledgement of T3), and/or the nonce value. In such embodiments, the initiator (second) wireless device is configured to generate a signed message, e.g., the signed [S]ACK_1 message 240 of FIG. 2, by assembling a payload, and applying a hash function to the assembled payload (which may be different from, or the same as, the hash function used with respect to the first payload of the first signed message produced by the responder device) using a secret cryptographic key associated with the second (initiator) wireless device (e.g., a unique private key of a private-public key pair, different from the key pair used by the responder device, or, alternatively, a secret symmetric key which may be the same as that used by the responder device).

In some embodiments, the acknowledgement message transmitted by the initiator device in response to receiving the first signed message may not be configured to have a payload, and thus, in such embodiments, a different mechanism to verify the acknowledgement message may be used. For example, in some variations, receiving the verifiable acknowledgement message may include further receiving, by the first wireless device, subsequent to receiving the verifiable acknowledgement message at the fourth time instance, a further signed message with a further payload from the second wireless device within a threshold time period following the receiving the verifiable acknowledgement message at the fourth time instance, by the first wireless device, with the further signed message being configured to indicate that the verifiable acknowledgement message was transmitted by the second wireless device. Means for further receiving, by the first wireless device, subsequent to receiving the verifiable acknowledgement message at the fourth time instance, a further signed message with a further payload from the second wireless device within a threshold time period following the receiving the verifiable acknowledgement message at the fourth time instance, by the first wireless device, with the further signed message being configured to indicate that the verifiable acknowledgement message was transmitted by the second wireless device may include, for example, any combination of processor 610, wide area network transceiver(s) 604, and/or local area network transceiver(s) 606 as illustrated in FIG. 6.

Thus, in such situations, the initiator device is configured to send the acknowledgement message as a non-signed message, but follows-up, within a pre-determined time period, with the sending of an initiator-generated signed message (which, like the signed acknowledgement message discussed herein, may include a payload comprising identifiers, timing information (e.g., T2 and/or T3, both of which may be available when the follow-up message is transmitted), a nonce value, etc., and which is signed by applying a hash value to the payload using the initiator device's secret cryptographic key), such as the message 242 (STM_1* of FIG. 2). The first, responder, wireless device is, in turn, configured to expect and receive an acknowledgement message and a follow-up confirmatory message.

As further depicted in FIG. 4, having received the verifiable acknowledgement message, the first wireless device verifies 430 that the verifiable acknowledgement message originated from the second wireless device. For example, if the verifiable acknowledgement message is a signed acknowledgement message, the responder device verifies that the signed acknowledgement message did in fact originate from the initiator device (i.e., that the acknowledgement device, including the payload content, were generated at the initiator device, and transmitted by the initiator device, even if the responder received the message from some intermediary device, such as the attacker device 206). Verifying the signed acknowledgement message may be performed by using a cryptographic hash function that is applied to the received message (the payload and signature portion) using a cryptographic key associated with the initiator device, to authenticate the acknowledgement message (e.g., that the signature was generated using the correct secret key of the initiator device, and thus that the message originated from a legitimate device). If the acknowledgement message is verified, the responder device accepts the acknowledgement message. If the acknowledgement message is not verified, the RTT exchange process may be terminated. Means for performing block 430 can include, for example, any combination of processor 610, wide area network transceiver(s) 604, and/or local area network transceiver(s) 606 as illustrated in FIG. 6.

Alternatively, if the verifiable acknowledgement message includes an unsigned acknowledgement message, the responder device may wait to see if it receives, within a pre-determined period of time, a signed confirmatory message from the initiator device. If such a follow-up confirmatory message is not received substantially within the pre-determined period of time (some tolerance level may be utilized), or if the signed confirmatory message cannot be verified/authenticated, the verifiable acknowledgement message is not accepted, and the RTT exchange process (as illustrated in FIGS. 2 and 3) may be terminated. As noted, alternatively, the responder device may continue with the call flow, with the purpose of providing a non-secure RTT service to the initiator, and/or alert about a possible intruder/attacker.

As noted, in some embodiments, implementation of the verifiable acknowledgement message may be performed by including a random or pseudo-random delay, at the initiator device, between receipt of the first signed timing measurement message (e.g., the message 220 or the copy message 220') and transmission of an unsigned acknowledgement message. In such embodiments, the responder device may be configured to estimate the expected delay between the time the first signed message should have been received at the initiator device and the time it should receive the unsigned acknowledgement message (taking to account the pseudo-random delay, which may be based on some pre-determined function known to the responder and initiator devices, and an approximate location of the initiator device). If the unsigned acknowledgement signal is not received within the estimates delay (subject to some tolerance level), the acknowledgement message may be rejected (and the RTT process terminated). In embodiments where a random delay is used to implement the verifiable acknowledgement message, the implementation may be made more robust, in terms of improving its ability to detect an attacker, by repeating the RTT message exchange process multiple times (e.g., two, three, or more times), and checking that all computed RTTs came back positive and are substantially consistent (i.e., not wildly diverging). Such an implementation could make it less likely that a relay attacker would have been able to, multiple times, guess the random (or pseudo-random) delay correctly. It is noted that, in some situations, the attacker may try to guess the delay. After the attacker guesses the delay, and sends its own early acknowledgement message, the attacker may wait to receive the real, unsigned acknowledgement message from the initiator device, to assess the extent or degree to which the attacker's guess was accurate. If the attacker can determine that it guessed wrongly, it may be able to cause the RTT exchange process to be aborted, which is an outcome consistent with the protection being sought for the exchange between the initiator and responder devices With continued reference to FIG. 4, responsive to a verification that the received acknowledgement message originated from the second wireless device (i.e., the verifiable acknowledgement message is deemed to have originated from the initiator device), the first, responder, wireless device, transmits 440 a second signed message comprising a second payload with at least timing information for the first time instance and the fourth time instance at which the first wireless device received the verifiable acknowledgement message. As with the first signed message, the second signed message is generated by producing the payload (e.g., the timing information, device identifiers, a nonce value, etc.), and deriving a hash value based on the payload and using the responder device's secret cryptographic key. The timing information in the second signed message can then be used, if received and authenticated by the initiator device, to compute the RTT for the initiator and responder devices, and based on that timing information to compute the range between the two devices (and/or to derive location estimates for the device). Means for performing block 440 can include, for example, any combination of processor 610, wide area network transceiver(s) 604, and/or local area network transceiver(s) 606 as illustrated in FIG. 6.

In some embodiments, at least some of the payload included in the second signed messages (and/or in any of the other messages exchanged between the devices) may be encrypted (independently of the cryptographic generation of the signatures) so as to obfuscate timing data to thus inhibit eavesdropping. For example, the data transmitted (e.g., the timing data for T1 and T4 included in the second signed message) may be encrypted using an encryption key (which may be a symmetric or asymmetric cryptographic key). For example, the sending device may use a public key associated with the destination (receiving) device to encrypt the data, to thus allow only the receiving device to be able to decrypt the encrypted data (using the private key stored at the receiving device). Data obfuscation may be implemented in order to provide range/location data privacy. Encryption of the payload may be performed using a different cryptographic key(s) than that used to generate signatures.

Figure 5:
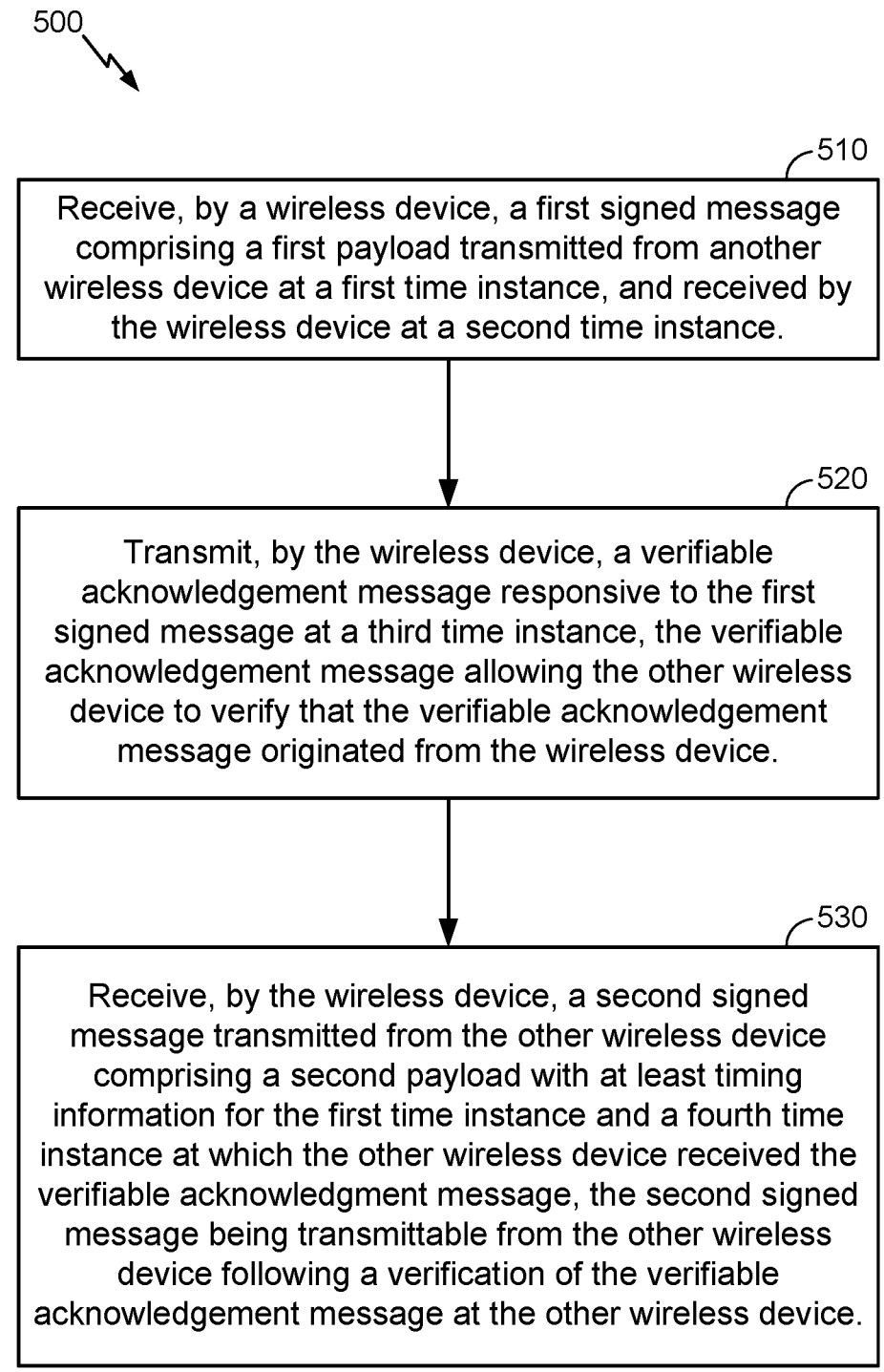
FIG. 5 is a flowchart of an example procedure for secure range determination, generally performed at an initiator wireless device.

With reference now to FIG. 5, a flowchart of an example procedure 500 for secure range determination, generally performed at an initiator device, is shown. The operations described in relation to FIG. 5 are performed as the initiator device is interacting with (e.g., responding to the operations performed by) the responder device, as more particularly illustrated and described in relation to FIG. 4. The procedure 500 includes receiving 510, by a wireless device (e.g., the initiator device 204 of FIG. 2), a first signed message (such as the message 230 or the copy message 230' depicted in FIG. 2) comprising a first payload transmitted from another wireless device (e.g., the responder device 202 of FIG. 2) at a first time instance (in this example, the time T1 marked in FIG. 2), and received by the wireless device at a second time instance (T2 in FIG. 2). As noted, the first payload may include such information as device identifiers or network addresses, associated with the responder and/or initiator devices, a nonce value (e.g., sequence number), timing information (e.g., time of arrival of a timing measurement request message, such as the message 210 or 210' of FIG. 2), and/or other types of information. Means for performing block 510 can include, for example, any combination of processor 610, wide area network transceiver(s) 604, and/or local area network transceiver(s) 606 as illustrated in FIG. 6.

As further depicted in FIG. 5, the wireless device transmits 520 a verifiable acknowledgement message responsive to the first signed message at a third time instance (e.g., T3 in FIG. 2), with the verifiable acknowledgement message allowing the other wireless device to verify that the verifiable acknowledgement message originated from the wireless device. Means for performing block 520 can include, for example, any combination of processor 610, wide area network transceiver(s) 604, and/or local area network transceiver(s) 606 as illustrated in FIG. 6.

As discussed herein, in some embodiments, transmitting the verifiable acknowledgement message may include producing, at the wireless device, a signed acknowledgement (i.e., cryptographically verifiable) message that includes an acknowledgement payload, and transmitting the signed acknowledgement message. For example, the payload may include device identifiers or network addresses associated with one or both of the interacting wireless devices, a nonce (such as a sequence value). A function (e.g., hash function) is applied to the acknowledgement payload to produce an acknowledgement hash value, and the wireless device's secret cryptographic key (be it a symmetrical or a private asymmetrical cryptographic key) is used to generate the signature portion of the verifiable acknowledgement message. At the destination of the transmitted acknowledgement message, the responder device cryptographically verifies the signature portion using a cryptographic key associated with the initiator device (e.g., a public key of a public-private asymmetric key pair), and based on the received payload and signature in the acknowledgement message. If the acknowledgement message is verified, the responder device determines that the acknowledgement message is authentic and was in fact produced (originated from) the initiator device. Means for producing a signed acknowledgement message that includes an acknowledgement payload and transmitting the signed acknowledgement message may include, for example, any combination of processor 610, wide area network transceiver(s) 604, and/or local area network transceiver(s) 606 as illustrated in FIG. 6.

Alternatively, in some embodiments, transmitting the verifiable acknowledgement message may include transmitting, by the wireless device, the verifiable acknowledgement message after a random delay period following receipt of the first signed message from the other wireless device. The random delay created at the initiator device can also be estimated at the responder device to thus allow the responder device to determine if the measured delay between the time it sent the first signed message and the time it received the verifiable acknowledgement message substantially matches the estimated delay. As also discussed herein, in some embodiments, transmitting the verifiable acknowledgement message may include transmitting, subsequent to transmitting the verifiable acknowledgement message a further signed message (referred to as a confirmatory signed message) with a further payload, within a threshold (known) time period following transmission of the verifiable acknowledgement message, with the further signed message configured to indicate that the verifiable acknowledgement message was transmitted by the wireless device. The responder device can thus determine if the confirmatory signed message did indeed originate from the initiator device (e.g., using the signature portion and payload to authenticate the message, in the manner described herein), and if so, whether the confirmatory signed message was received, at the responder device, within a pre-determined time period from the time that the acknowledgement message was received at the responder device. If both these conditions are met, the verifiable message is deemed to have originated from the initiator device, and the acknowledgement message and/or confirmatory message are accepted and the time-of-arrival, T4, of either the acknowledgement message or the confirmatory signed message is recorded, and subsequently used to populate the payload of a second signed message generated by the responder device (e.g., the message 250 of FIG. 2). Means for transmitting the verifiable acknowledgement message (using a random delay and/or a confirmatory message) may include, for example, any combination of processor 610, wide area network transceiver(s) 604, and/or local area network transceiver(s) 606 as illustrated in FIG. 6.

Returning to FIG. 5, the procedure 500 further includes receiving 530, by the wireless device (the initiator device), the second signed message transmitted from the other wireless device (namely, the responder device) comprising the second payload which includes at least timing information for the first time instance and a fourth time instance at which the other wireless device received the verifiable acknowledgment message (or the confirmatory message accompanying the acknowledgement message). The second signed message is transmittable from the other wireless device following a verification of the verifiable acknowledgement message at the other wireless device. Means for performing block 530 can include, for example, any combination of processor 610, wide area network transceiver(s) 604, and/or local area network transceiver(s) 606 as illustrated in FIG. 6.

The second payload of the second signed message may include, in addition to the timing information (which may be in the form of timestamps) for T1 and T4 (as depicted in FIG. 2), device identifiers and/or other types of network addresses for one or more of the initiator and responder wireless devices, a nonce value (e.g., the varying sequence number), and/or other types of information. As noted, in some embodiments, at least some of the payload included in the second signed message (and/or in any of the other messages exchanged between the devices) may be encrypted (e.g., using a cryptographic key which may be same or different from the cryptographic key used to sign messages for authentication purposes) so as to obfuscate timing information used to derive rtt/range between the two wireless peers. For example, the data transmitted (e.g., the timing data for T1 and T4 included in the second signed message) may be encrypted using a secret encryption key (which may be a symmetric or asymmetric cryptographic key) that is known, or is disclosed, to the initiator and responder devices.

Having received the second signed message, if the initiator device is able to authenticate the second signed message (e.g., based on the payload and the signature portion of the second signed message), the initiator device may determine the first time instance and the fourth time instance from the timing information included in the second signed message, and determine a correct range between the wireless device and the other wireless device based, at least in part, on the determined first time instance and the fourth time instance. Additionally, the initiator device may also determine location information (e.g., its exact or approximate position) based on the range computed via the procedure 500. As noted, at least some of the range determination and/or location determination operations may be performed at a remote device, such as the server 150 of FIG. 1, to which the initiator device may communicate the timing information used to derive the range and/or the location information. Means for determining the first time instance and the fourth time instance, and/or for performing range determination, may include, for example, any combination of processor 610, the range determination module 616, the RTT module 622, the wide area network transceiver(s) 604, and/or local area network transceiver(s) 606 as illustrated in FIG. 6.

With reference now to FIG. 6, a schematic diagram illustrating various components of an example device 600, which may be, at least partly, similar to (in implementation and/or functionality) any of the devices 114, 122, 134, 140, 142, 150, 202, 204, 302, and 304 depicted in FIGS. 1-3 is shown. The example device 600 is typically a wireless device, such as a mobile wireless device, or a stationary wireless device. For the sake of simplicity, the various features/components/functions illustrated in the schematic boxes of FIG. 6 are connected together using a common bus to represent that these various features/components/functions are operatively coupled together. Other connections, mechanisms, features, functions, or the like, may be provided and adapted as appropriate to operatively couple and configure a portable wireless device. Furthermore, one or more of the features or functions illustrated in the example of FIG. 6 may be further subdivided, or two or more of the features or functions illustrated in FIG. 6 may be combined. Additionally, one or more of the features or functions illustrated in FIG. 6 may be excluded.

As shown, the wireless device 600 may include one or more local area network transceivers 606 that may be connected to one or more antennas 602. The one or more local area network transceivers 606 comprise suitable devices, circuits, hardware, and/or software for communicating with and/or detecting signals to/from one or more WLAN access points (such as the wireless devices 122 and/or 142 depicted in FIG. 1), and/or directly with other wireless devices within a network. In some embodiments, the local area network transceiver(s) 606 may comprise a WiFi communication transceiver suitable for communicating with one or more wireless access points; however, in some embodiments, the local area network transceiver(s) 606 may be configured to communicate with other types of local area networks, personal area networks (e.g., Bluetooth® wireless technology networks), etc. Additionally, any other type of wireless networking technologies, including near-field technologies, may be used, including, for example, Ultra Wide Band, ZigBee, wireless USB, etc.

The wireless device 600 may also include, in some implementations, one or more wide area network transceiver(s) 604 that may be connected to the one or more antennas 602. The wide area network transceiver 604 may comprise suitable devices, circuits, hardware, and/or software for communicating with and/or detecting signals from one or more of, for example, WWAN wireless devices, such as the WWAN wireless device 140 illustrated in FIG. 1. In some implementations, the wide area network transceiver(s) 604 may comprise a CDMA communication system suitable for communicating with a CDMA network of wireless base stations. In some implementations, the wireless communication system may comprise other types of cellular telephony networks, such as, for example, TDMA, GSM, WCDMA, LTE etc. Additionally, any other type of wireless networking technologies may be used, including, for example, WiMax, etc.

In some embodiments, an SPS receiver (also referred to as a global navigation satellite system (GNSS) receiver) 608 may also be included with the wireless device 600. The SPS receiver 608 may be connected to the one or more antennas 602 for receiving satellite signals. The SPS receiver 608 may comprise any suitable hardware and/or software for receiving and processing SPS signals. The SPS receiver 608 may request information as appropriate from the other systems, and may perform the computations to determine the position of the wireless device 600 using, in part, measurements obtained by any suitable SPS procedure.

As further illustrated in FIG. 6, the example device 600 includes one or more sensors 612 coupled to a processor 610 (which may also be referred to as a controller). For example, the sensors 612 may include motion sensors to provide relative movement and/or orientation information (which is independent of motion data derived from signals received by the wide area network transceiver(s) 604, the local area network transceiver(s) 606, and/or the SPS receiver 608, and may be used to supplement range data determined by the procedures described herein, and/or to facilitate location determination operations). By way of example but not limitation, the motion sensors may include an accelerometer 612*a*, a gyroscope 612*b*, and a geomagnetic (magnetometer) sensor 612*c* (e.g., a compass), any of which may be implemented based on micro-electro-mechanical-system (MEMS), or based on some other technology. The one or more sensors 612 may further include an altimeter (e.g., a barometric pressure altimeter) 612*d*, a thermometer (e.g., a thermistor) 612*e*, an audio sensor 612*f* (e.g., a microphone) and/or other sensors. As further shown in FIG. 6, in some embodiments, the one or more sensors 612 may also include a camera 612*g* (e.g., a charge-couple device (CCD)-type camera, a CMOS-based image sensor, etc.), which may produce still or moving images (e.g., a video sequence) that may be displayed on a user interface device, such as a display or a screen, and that may be further used to determine an ambient level of illumination and/or information related to colors and existence and levels of ultraviolet and/or infrared illumination.

The processor 610 may be connected to the local area network transceiver(s) 606, the wide area network transceiver(s) 604, the SPS receiver 608, the antennas 602, and/or the one or more sensors 612. Although illustrated as a single processor 610, it is understood that the processor(s) may include one or more microprocessors, microcontrollers, and/or digital signal processors that provide processing functions, as well as other calculation and control functionality. The processor 610 may be coupled to storage media (e.g., memory) 614 for storing data and software instructions for executing programmed functionality within the wireless device, including instructions executed to implement, for example, the procedures 400 and 500 used for performing secure range determination using an RTT-based secure/verifiable message exchange between two wireless devices. The memory 614 may be on-board the processor 610 (e.g., within the same integrated circuit (IC) package), and/or the memory may be external memory to the processor and functionally coupled over a data bus. Further details regarding an example embodiment of a processor or computation system, which may be similar to the processor 610, are provided below in relation to FIG. 6.

A number of software modules and data tables may reside in memory 614 and may be utilized by the processor 610 in order to manage both communications with remote devices/nodes (such as the various wireless devices/nodes and/or the server depicted in FIGS. 1-3), perform secure range determination operations, and/or perform device control functionality. As illustrated in FIG. 6, in some embodiments, the memory 614 may include a positioning and range determination module 616, an application module 618, a received signal strength indicator (RSSI) module 620, and/or an RTT module 622 (the RTT module may be used in addition to, or in place of, the positioning and range determination module 616). It is to be noted that the functionality of the modules and/or data structures may be combined, separated, and/or be structured in different ways depending upon the implementation of the wireless device 600. For example, the RSSI module 620 and/or the RTT module 622 may each be realized, at least partially, as a hardware-based implementation, and may thus include such devices or circuits as a dedicated antenna (e.g., a dedicated RTT and/or an RSSI antenna), a dedicated processing unit to process and analyze signals received and/or transmitted via the antenna(s) (e.g., to generate and process signed messages, determine signal strength of received signals, determine timing information in relation to communicated messages, etc.)

The application module 618 may be a process running on the processor 610 of the wireless device 600, which requests position and/or range information from the positioning and range determination module 616. Applications typically run within an upper layer of the software architectures, and may include navigation applications, shopping applications, location-aware service applications, etc. For example, when used to determine ranges between the device 600 and other wireless devices in its vicinity (e.g., other wireless devices installed in near-by vehicles), the application module 618 may include an application to display information about the proximity of other vehicles to the vehicle in which the device 600 is installed, and to raise an alarm if it appears that another vehicle (that includes an installed wireless device broadcasting messages from which range information may be derived) is too close to the wireless device 600. The application module 618 may also include an application to alert about possible malicious attacks and to take actions to remedy or mitigate such potential attacks.

The positioning and range determination module 616 may also determine location information for the wireless device 600 using information derived from various receivers and modules of the wireless device 600. In some embodiments, the range determination module 616 may be configured to determine ranges to other wireless devices based, in part, on information (e.g., timing information and identification information) obtained by the device 600 through a message exchange with another device (a message exchange based on an RTT protocol, implemented based on WiFi or near-field communication technologies). In such embodiments, the device may be configured to transmit and receive signed timing measurement messages, and to transmit or receive verifiable acknowledgement messages, as more particularly described herein in relation to FIGS. 2-5. In some embodiments, the range determination module 616 may be configured to determine location information (e.g., determine an approximate location) based, at least in part, on timing information communicated via the RTT message exchange implemented through the procedures described herein.

As further illustrated, the wireless device 600 may also include assistance data storage 624, where assistance data (which may have been downloaded from a remote server), such as map information, data records relating to location information in an area where the device is currently located, known locations of stationary wireless devices, etc., is stored. In some embodiments, the wireless device 600 may also be configured to receive supplemental information that includes auxiliary position and/or motion data which may be determined from other sources (e.g., from the one or more sensors 612). Such auxiliary position data may be incomplete or noisy, but may be useful as another source of independent information for estimating the position of the device 600, or for performing other operations or functions. Supplemental information may also include, but not be limited to, information that can be derived or based upon Bluetooth signals, beacons, radio-frequency identification (RFID) tags, and/or information derived from a map (e.g., receiving coordinates from a digital representation of a geographical map by, for example, a user interacting with a digital map). The supplemental information may optionally be stored in a storage module 626 schematically depicted in FIG. 6. Also included with the memory 614 of the wireless device 600 is a key storage module 628 configured to securely obtain and store cryptographic keys used for the processes described herein (including the signing of RTT-based messages). Access to this module may be restricted to specific software/protocols.

The wireless device 600 may further include a user interface 650 providing suitable interface systems, such as a microphone/speaker 652, a keypad 654, and a display 656 that allows user interaction with the wireless device 600. The microphone/speaker 652 (which may be the same or different from the audio sensor 6120 provides for voice communication services (e.g., using the wide area network transceiver(s) 604 and/or the local area network transceiver(s) 606). The keypad 654 may comprise suitable buttons for user input. The display 656 may include a suitable display, such as, for example, a backlit liquid crystal display (LCD), and may further include a touch screen display for additional user input modes.

Figure 7:
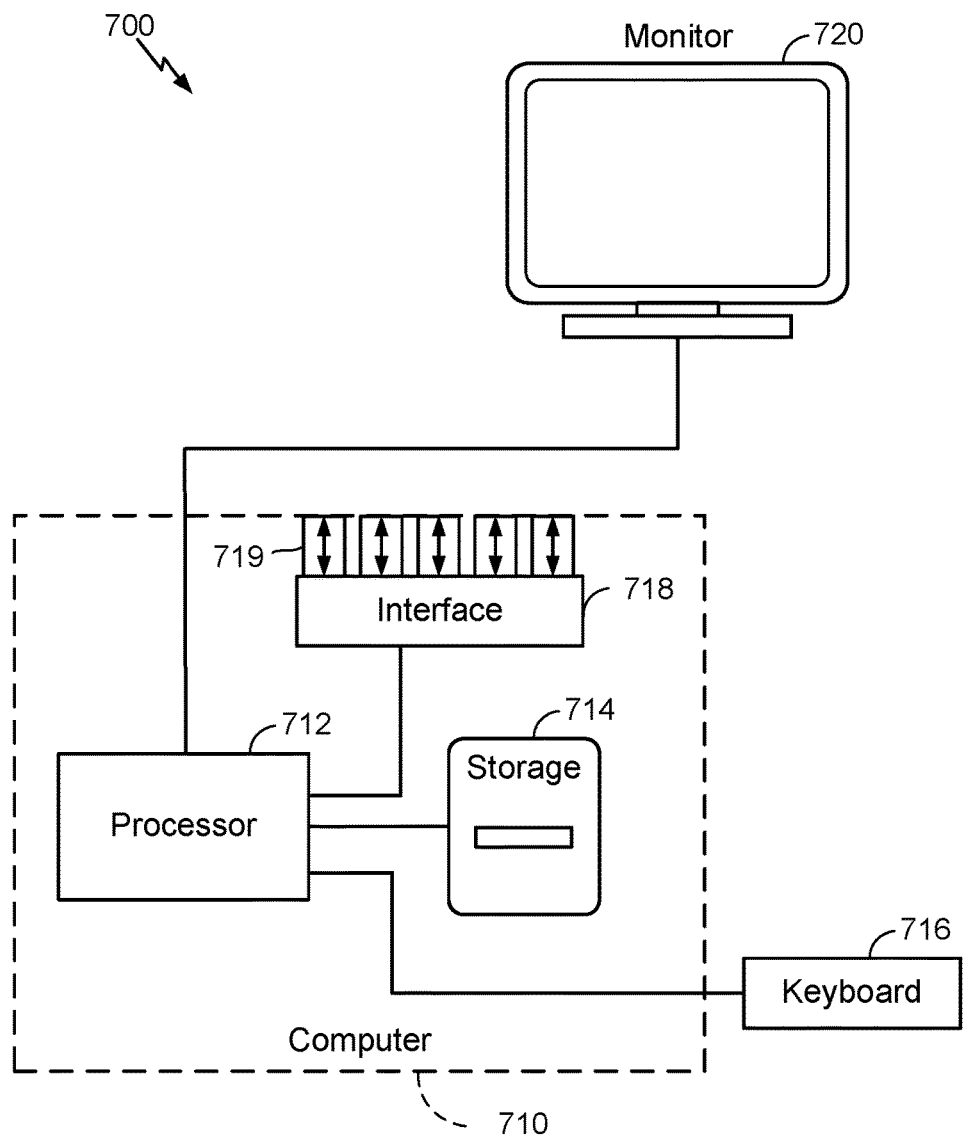
FIG. 7 is a schematic diagram of an example computing system.

Performing the procedures described herein may also be facilitated by a processor-based computing system. With reference to FIG. 7, a schematic diagram of an example computing system 700 is shown. The computing system 700 may be housed in, for example, a wireless device such as the devices 114, 122, 134, 202, 204, 302, 304, and/or 600 of FIGS. 1, 2, 3, and 6, and/or may comprise at least part of, or all of, servers, nodes, access points, base stations, and/or WAN-WAPs such as the nodes 140, 142, and 150 depicted in FIG. 1. The computing system 700 includes a computing-based device 710 such as a personal computer, a specialized computing device, a controller, and so forth, that typically includes a central processor unit (CPU) 712. In addition to the CPU 712, the system includes main memory, cache memory and bus interface circuits (not shown). The computing-based device 710 may include a mass storage device 714, such as a hard drive and/or a flash drive associated with the computer system. The computing system 700 may further include a keyboard, or keypad, 716, and a monitor 720, e.g., a CRT (cathode ray tube) or LCD monitor, that may be placed where a user can access them (e.g., a wireless device's screen).

The computing-based device 710 is configured to facilitate, for example, the implementation of one or more of the procedures described herein (including the procedures to implement a secure range determination using an RTT-based secure/verifiable message exchange between two wireless devices, determine location information, etc.) The mass storage device 714 may thus include a computer program product that, when executed on the computing-based device 710, causes the computing-based device to perform operations to facilitate the implementation of the procedures described herein. The computing-based device may further include peripheral devices to enable input/output functionality. Such peripheral devices may include, for example, a CD-ROM drive and/or flash drive, or a network connection, for downloading related content to the connected system. Such peripheral devices may also be used for downloading software containing computer instructions to enable general operation of the respective system/device. For example, as illustrated in FIG. 7, the computing-based device 710 may include an interface 718 with one or more interfacing circuits (e.g., a wireless port that include transceiver circuitry, a network port with circuitry to interface with one or more network device, etc.) to provide/implement communication with remote devices (e.g., so that a wireless device, such as any of the wireless devices of FIG. 1, or any other wireless device depicted in any of the figures, could communicate, via a port such as the port 719, with another wireless device). Alternatively and/or additionally, in some embodiments, special purpose logic circuitry, e.g., an FPGA (field programmable gate array), a digital signal processor (DSP), an ASIC (application-specific integrated circuit), or other types of circuit-based and hardware arrangements may be used in the implementation of the computing system 700. Other modules that may be included with the computing-based device 710 are speakers, a sound card, a pointing device, e.g., a mouse or a trackball, by which the user can provide input to the computing system 700. The computing-based device 710 may include an operating system.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

Memory may be implemented within the computing-based device 710 or external to the device. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

As used herein, a wireless device or station (MS) refers to a device such as a cellular or other wireless communication device, a smartphone, tablet, personal communication system (PCS) device, personal navigation device (PND), Personal Information Manager (PIM), Personal Digital Assistant (PDA), laptop or other suitable wireless device which is capable of receiving wireless communication and/or navigation signals, such as navigation positioning signals. The term "mobile station" (or "wireless device") is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, tablet devices, etc., which are capable of communication with a server, such as via the Internet, WiFi, or other network, and to communicate with one or more types of nodes, regardless of whether satellite signal reception, assistance data reception, and/or position-related processing occurs at the device, at a server, or at another device or node associated with the network. Any operable combination of the above are also considered a "mobile station." A mobile device may also be referred to as a mobile terminal, a terminal, a user equipment (UE), a device, a Secure User Plane Location (SUPL) Enabled Terminal (SET), a target device, a target, or by some other name.

Although particular embodiments have been disclosed herein in detail, this has been done by way of example for purposes of illustration only, and is not intended to be limiting with respect to the scope of the appended claims, which follow. In particular, it is contemplated that various substitutions, alterations, and modifications may be made without departing from the spirit and scope of the invention as defined by the claims. Other aspects, advantages, and modifications are considered to be within the scope of the following claims. The claims presented are representative of the embodiments and features disclosed herein. Other unclaimed embodiments and features are also contemplated. Accordingly, other embodiments are within the scope of the following claims.

What is claimed is:

1. A method for secure range determination, the method comprising:

transmitting, by a first wireless device, a first signed message at a first time instance, the first signed message comprising a first payload and configured to be received by a second wireless device at a second time instance;

receiving at a fourth time instance, by the first wireless device, a verifiable acknowledgement message, transmitted from the second wireless device at a third time instance in response to the first signed message, the verifiable acknowledgement message allowing the first wireless device to verify that the verifiable acknowledgement message originated from the second wireless device;

receiving, by the first wireless device, a further signed message with a further payload from the second wireless device within a threshold time period following the receiving the verifiable acknowledgement message, wherein the further signed message is configured to indicate that the verifiable acknowledgement message was transmitted by the second wireless device;

verifying, at the first wireless device, that the verifiable acknowledgement message originated from the second wireless device; and responsive to a verification that the verifiable acknowledgement message originated from the second wireless device, transmitting, by the first wireless device, a second signed message comprising a second payload with at least timing information for the first time instance and the fourth time instance.

2. The method of claim 1, wherein each of the first payload and the second payload comprises one or more of: a first identifier associated with the first wireless device, a second identifier associated with the second wireless device, or a respective nonce value.

3. The method of claim 1, wherein the verifiable acknowledgement message comprises a signed acknowledgement message with an acknowledgement payload comprising one or more of: a first identifier associated with the first wireless device, a second identifier associated with the second wireless device, acknowledgement timing information associated with at least one of the verifiable acknowledgement message or the first signed message, or a nonce value.

4. The method of claim 1, wherein a range between the first wireless device and the second wireless device is determined based, at least in part, on the timing information for the first time instance and the fourth time instance included in the second payload.

5. The method of claim 1, wherein the first signed message, the second signed message, and the verifiable acknowledgement message are generated according to a fine timing measurement (FTM)-based round-trip time (RTT) protocol.

6. The method of claim 1, wherein the first signed message, the second signed message, and the verifiable acknowledgement message are generated according to a round-trip time (RTT) protocol performed using a radio technology comprising one or more of Bluetooth, near field communication (NFC), or WiFi.

7. The method of claim 1, wherein the first signed message and the second signed message are each signed using at least one cryptographic key associated with the first wireless device and the second wireless device, the at least one cryptographic key comprising one of: a symmetrical cryptographic key, or a private cryptographic key of a private-public asymmetric key pair.

8. A wireless device comprising:
a transceiver configured to:
transmit, by the wireless device, a first signed message at a first time instance, the first signed message comprising a first payload and configured to be received by another wireless device at a second time instance; and
receive, at a fourth time instance, a verifiable acknowledgement message transmitted from the other wireless device at a third time instance in response to the first signed message, the verifiable acknowledgement message allowing the wireless device to verify that the verifiable acknowledgement message originated from the other wireless device;
receive, by the first wireless device, a further signed message with a further payload from the second wireless device within a threshold time period following the receipt of the verifiable acknowledgement message, wherein the further signed message is configured to indicate that the verifiable acknowledgement message was transmitted by the second wireless device; and
one or more processors, coupled to the transceiver, configured to:
verify that the verifiable acknowledgement message originated from the other wireless device;
wherein the transceiver is further configured to, in response to a verification that the verifiable acknowledgement message originated from the other wireless device, transmit a second signed message comprising a second payload with at least timing information for the first time instance and the fourth time instance.

9. The wireless device of claim 8, wherein each of the first payload and the second payload comprises one or more of: a first identifier associated with the wireless device, a second identifier associated with the other wireless device, or a respective nonce value.

10. The wireless device of claim 8, wherein the verifiable acknowledgement message comprises a signed acknowledgement message with an acknowledgement payload comprising one or more of: a first identifier associated with the wireless device, a second identifier associated with the other wireless device, acknowledgement timing information associated with at least one of the verifiable acknowledgement message or the first signed message, or a nonce value.

11. The wireless device of claim 8, wherein a range between the wireless device and the other wireless device is determined based, at least in part, on the timing information for the first time instance and the fourth time instance included in the second payload.

12. The wireless device of claim 8, wherein the first signed message, the second signed message, and the verifiable acknowledgement message are generated according to a fine timing measurement (FTM)-based round-trip time (RTT) protocol.

13. The wireless device of claim 8, wherein the first signed message, the second signed message, and the verifiable acknowledgement message are generated according to a round-trip time (RTT) protocol performed using a radio technology comprising one or more of Bluetooth, near field communication (NFC), or WiFi.

14. The wireless device of claim 8, wherein the first signed message and the second signed message are each signed using at least one cryptographic key associated with the wireless device and the other wireless device, the at least one cryptographic key comprising one of: a symmetrical cryptographic key, or a private cryptographic key of a private-public asymmetric key pair.

15. An apparatus for secure range determination, the apparatus comprising:
means for transmitting, by a first wireless device, a first signed message at a first time instance, the first signed message comprising a first payload and configured to be received by a second wireless device at a second time instance;
means for receiving, at a fourth time instance, by the first wireless device, a verifiable acknowledgement message, transmitted from the second wireless device at a third time instance in response to the first signed message, the verifiable acknowledgement message allowing the first wireless device to verify that the verifiable acknowledgement message originated from the second wireless device;
means for receiving, by the first wireless device, a further signed message with a further payload from the second wireless device within a threshold time period following the receiving the verifiable acknowledgement message, wherein the further signed message is configured to indicate that the verifiable acknowledgement message was transmitted by the second wireless device;
means for verifying, at the first wireless device, that the verifiable acknowledgement message originated from the second wireless device; and
means for transmitting, by the first wireless device, in response to a verification that the verifiable acknowledgement message originated from the second wireless device, a second signed message comprising a second payload with at least timing information for the first time instance and the fourth time instance.

16. The apparatus of claim 15, wherein each of the first payload and the second payload comprises one or more of: a first identifier associated with the first wireless device, a second identifier associated with the second wireless device, or a respective nonce value.

17. The apparatus of claim 15, wherein the verifiable acknowledgement message comprises a signed acknowledgement message with an acknowledgement payload comprising one or more of: a first identifier associated with the first wireless device, a second identifier associated with the second wireless device, acknowledgement timing information associated with at least one of the verifiable acknowledgement message or the first signed message, or a nonce value.

18. The apparatus of claim 15, wherein a range between the first wireless device and the second wireless device is determined based, at least in part, on the timing information for the first time instance and the fourth time instance included in the second payload.

19. The apparatus of claim 15, wherein the first signed message, the second signed message, and the verifiable acknowledgement message are generated according to a fine timing measurement (FTM)-based round-trip time (RTT) protocol.

20. The apparatus of claim 15, wherein the first signed message, the second signed message, and the verifiable acknowledgement message are generated according to a round-trip time (RTT) protocol performed using a radio technology comprising one or more of Bluetooth, near field communication (NFC), or WiFi.

21. The apparatus of claim 15, wherein the first signed message and the second signed message are each signed using at least one cryptographic key associated with the first wireless device and the second wireless device, the at least one cryptographic key comprising one of: a symmetrical cryptographic key, or a private cryptographic key of a private-public asymmetric key pair.

22. A non-transitory computer readable media programmed with instructions, executable on a processor, to:
transmit, by a first wireless device, a first signed message at a first time instance, the first signed message comprising a first payload and configured to be received by a second wireless device at a second time instance;
receive, at a fourth time instance, by the first wireless device, a verifiable acknowledgement message, transmitted from the second wireless device at a third time instance in response to the first signed message, the verifiable acknowledgement message allowing the first wireless device to verify that the verifiable acknowledgement message originated from the second wireless device;
receive, by the first wireless device, a further signed message with a further payload from the second wireless device within a threshold time period following the receiving the verifiable acknowledgement message, wherein the further signed message is configured to indicate that the verifiable acknowledgement message was transmitted by the second wireless device;
verify, at the first wireless device, that the verifiable acknowledgement message originated from the second wireless device; and
responsive to a verification that the verifiable acknowledgement message originated from the second wireless device, transmit, by the first wireless device, a second signed message comprising a second payload with at least timing information for the first time instance and the fourth time instance.

23. The computer readable media of claim 22, wherein each of the first payload and the second payload comprises one or more of: a first identifier associated with the first wireless device, a second identifier associated with the second wireless device, or a respective nonce value.

24. The computer readable media of claim 22, wherein the verifiable acknowledgement message comprises a signed acknowledgement message with an acknowledgement payload comprising one or more of: a first identifier associated with the first wireless device, a second identifier associated with the second wireless device, acknowledgement timing information associated with at least one of the verifiable acknowledgement message or the first signed message, or a nonce value.

25. The computer readable media of claim 22, wherein a range between the first wireless device and the second wireless device is determined based, at least in part, on the timing information for the first time instance and the fourth time instance included in the second payload.

26. The computer readable media of claim 22, wherein the first signed message, the second signed message, and the verifiable acknowledgement message are generated according to a fine timing measurement (FTM)-based round-trip time (RTT) protocol.

27. A method for secure range determination, the method comprising:
receiving, by a wireless device, a first signed message comprising a first payload transmitted from another wireless device at a first time instance, and received by the wireless device at a second time instance;
transmitting at a third time instance, by the wireless device, a verifiable acknowledgement message responsive to the first signed message, the verifiable acknowledgement message allowing the other wireless device to verify that the verifiable acknowledgement message originated from the wireless device, wherein transmitting the verifiable acknowledgement message comprises one of:
 transmitting, by the wireless device, the verifiable acknowledgement message after a random delay period following receipt of the first signed message from the other wireless device; or
 further transmitting, subsequent to the transmitting the verifiable acknowledgement message, by the wireless device, a further signed message with a further payload from the wireless device within a threshold time period following the transmitting the verifiable acknowledgement message, the further signed message configured to indicate that the verifiable acknowledgement message was transmitted by the wireless device; and
receiving, by the wireless device, a second signed message transmitted from the other wireless device comprising a second payload with at least timing information for the first time instance and a fourth time instance at which the other wireless device received the verifiable acknowledgment message, the second signed message being transmittable from the other wireless device following a verification of the verifiable acknowledgement message at the other wireless device.

28. The method of claim 27, wherein each of the first payload and the second payload comprises one or more of: an identifier associated with the wireless device, another identifier associated with the other wireless device, or a respective nonce value.

29. The method of claim 28, wherein the respective nonce value is computed at the other wireless device based on one or more of: a sequence value used for exchanging messages between the wireless device and the other wireless device, or a random value.

30. The method of claim 27, wherein transmitting the verifiable acknowledgement message comprises:
producing, at the wireless device, a signed acknowledgement message comprising an acknowledgement payload; and
transmitting the signed acknowledgement message.

31. The method of claim 30, wherein the acknowledgement payload comprises one or more of: an identifier associated with the wireless device, another identifier associated with the other wireless device, acknowledgement timing information associated with the verifiable acknowledgement message or the first signed message, or a nonce value.

32. The method of claim 27, further comprising:
in response to receiving the second signed message:
determining the first time instance and the fourth time instance from the timing information included in the second payload of the second signed message, and
determining a range between the wireless device and the other wireless device based, at least in part, on the determined first time instance and the fourth time instance.

33. The method of claim 27, wherein the first signed message, the second signed message, and the verifiable acknowledgement message are generated according to a fine timing measurement (FTM)-based round-trip time (RTT) protocol.

34. The method of claim 27, wherein the first signed message, the second signed message, and the verifiable acknowledgement message are generated according to a round-trip time (RTT) protocol performed using a radio technology comprising one or more of Bluetooth, near field communication (NFC), or WiFi.

35. The method of claim 27, wherein the first signed message and the second signed message are each signed using at least one cryptographic key associated with the wireless device and the other wireless device, the at least one cryptographic key comprising one of: a symmetrical cryptographic key, or a private cryptographic key of a private-public key pair.

36. A wireless device comprising:
one or more processors; and
a transceiver coupled to the one or more processors, the transceiver configured to:
receive a first signed message comprising a first payload transmitted from another wireless device at a first time instance, and received by the wireless device at a second time instance;
transmit at a third time instance, by the wireless device, a verifiable acknowledgement message responsive to the first signed message, the verifiable acknowledgement message allowing the other wireless device to verify that the verifiable acknowledgement message originated from the wireless device, wherein the transceiver configured to transmit the verifiable acknowledgement message is configured to perform one of:
transmit the verifiable acknowledgement message after a random delay period following receipt of the first signed message from the other wireless device; or
further transmit, subsequent to the transmitting the verifiable acknowledgement message, a further signed message with a further payload from the wireless device within a threshold time period following transmission of the verifiable acknowledgement message, the further signed message configured to indicate that the verifiable acknowledgement message was transmitted by the wireless device; and
receive, by the wireless device, a second signed message transmitted from the other wireless device comprising a second payload with at least timing information for the first time instance and a fourth time instance at which the other wireless device received the verifiable acknowledgment message, the second signed message being transmittable from the other wireless device following a verification of the verifiable acknowledgement message at the other wireless device.

37. The wireless device of claim 36, wherein each of the first payload and the second payload comprises one or more of: an identifier associated with the wireless device, another identifier associated with the other wireless device, or a respective nonce value.

38. The wireless device of claim 37, wherein the respective nonce value is computed at the other wireless device based on one or more of: a sequence value used for exchanging messages between the wireless device and the other wireless device, or a random value.

39. The wireless device of claim 36, wherein the one or more processors are configured to produce, at the wireless device, a signed acknowledgement message comprising an acknowledgement payload;
and wherein the transceiver configured to transmit the verifiable acknowledgement message is configured to transmit the signed acknowledgement message.

40. The wireless device of claim 39, wherein the acknowledgement payload comprises one or more of: an identifier associated with the wireless device, another identifier associated with the other wireless device, acknowledgement timing information associated with the verifiable acknowledgement message or the first signed message, or a nonce value.

41. The wireless device of claim 36, wherein the one or more processor are configured, in response to receiving the second signed message, to:
determine the first time instance and the fourth time instance from the timing information included in the second payload of the second signed message, and
determine a range between the wireless device and the other wireless device based, at least in part, on the determined first time instance and the fourth time instance.

42. The wireless device of claim 36, wherein the first signed message, the second signed message, and the verifiable acknowledgement message are generated according to a fine timing measurement (FTM)-based round-trip time (RTT) protocol.

43. The wireless device of claim 36, wherein the first signed message, the second signed message, and the verifiable acknowledgement message are generated according to a round-trip time (RTT) protocol performed using a radio technology comprising one or more of Bluetooth, near field communication (NFC), or WiFi.

44. The wireless device of claim 36, wherein the first signed message and the second signed message are each signed using at least one cryptographic key associated with the wireless device and the other wireless device, the at least one cryptographic key comprising one of: a symmetrical cryptographic key, or a private cryptographic key of a private-public key pair.

45. An apparatus for secure range determination, the apparatus comprising:
  means for receiving, by a wireless device, a first signed message comprising a first payload transmitted from another wireless device at a first time instance, and received by the wireless device at a second time instance;
  means for transmitting at a third time instance, by the wireless device, a verifiable acknowledgement message responsive to the first signed message, the verifiable acknowledgement message allowing the other wireless device to verify that the verifiable acknowledgement message originated from the wireless device, wherein the means for transmitting the verifiable acknowledgement message comprises one of:
  means for transmitting, by the wireless device, the verifiable acknowledgement message after a random delay period following receipt of the first signed message from the other wireless device; or
  means for further transmitting, subsequent to the transmitting the verifiable acknowledgement message, by the wireless device, a further signed message with a further payload from the wireless device within a threshold time period following transmission of the verifiable acknowledgement message, the further signed message configured to indicate that the verifiable acknowledgement message was transmitted by the wireless device; and
  means for receiving, by the wireless device, a second signed message transmitted from the other wireless device comprising a second payload with at least timing information for the first time instance and a fourth time instance at which the other wireless device received the verifiable acknowledgment message, the second signed message being transmittable from the other wireless device following a verification of the verifiable acknowledgement message at the other wireless device.

46. The apparatus of claim 45, wherein each of the first payload and the second payload comprises one or more of: an identifier associated with the wireless device, another identifier associated with the other wireless device, or a respective nonce value.

47. The apparatus of claim 45, wherein the means for transmitting the verifiable acknowledgement message comprises:
  means for producing, at the wireless device, a signed acknowledgement message comprising an acknowledgement payload; and
  means for transmitting the signed acknowledgement message.

48. The apparatus of claim 45, further comprising:
  means for determining, in response to receiving the second signed message, the first time instance and the fourth time instance from the timing information included in the second payload of the second signed message, and
  means for determining a range between the wireless device and the other wireless device based, at least in part, on the determined first time instance and the fourth time instance.

49. The apparatus of claim 45, wherein the first signed message, the second signed message, and the verifiable acknowledgement message are generated according to a fine timing measurement (FTM)-based round-trip time (RTT) protocol.

50. A non-transitory computer readable media programmed with instructions, executable on a processor, to:
  receive, by a wireless device, a first signed message comprising a first payload transmitted from another wireless device at a first time instance, and received by the wireless device at a second time instance;
  transmit at a third time instance, by the wireless device, a verifiable acknowledgement message responsive to the first signed message, the verifiable acknowledgement message allowing the other wireless device to verify that the verifiable acknowledgement message originated from the wireless device, wherein the instructions to transmit the verifiable acknowledgement message comprise one or more instructions to perform one of:
  transmit, by the wireless device, the verifiable acknowledgement message after a random delay period following receipt of the first signed message from the other wireless device; or
  further transmit, subsequent to the transmitting the verifiable acknowledgement message, by the wireless device, a further signed message with a further payload from the wireless device within a threshold time period following transmission of the verifiable acknowledgement message, the further signed message configured to indicate that the verifiable acknowledgement message was transmitted by the wireless device; and
  receive, by the wireless device, a second signed message transmitted from the other wireless device comprising a second payload with at least timing information for the first time instance and a fourth time instance at which the other wireless device received the verifiable acknowledgment message, the second signed message being transmittable from the other wireless device following a verification of the verifiable acknowledgement message at the other wireless device.

51. The computer readable media of claim 50, wherein the instructions to transmit the verifiable acknowledgement message comprise one or more instructions to:
  produce, at the wireless device, a signed acknowledgement message comprising an acknowledgement payload; and
  transmit the signed acknowledgement message.

52. The computer readable media of claim 50, further comprising one or more instructions to:
  determine, in response to receiving the second signed message, the first time instance and the fourth time instance from the timing information included in the second payload of the second signed message, and
  determine a range between the wireless device and the other wireless device based, at least in part, on the determined first time instance and the fourth time instance.

* * * * *